US008552811B2

(12) United States Patent
Wu et al.

(10) Patent No.: US 8,552,811 B2
(45) Date of Patent: Oct. 8, 2013

(54) ELECTROMAGNETIC NOISE SUPPRESSION CIRCUIT

(75) Inventors: Tzong-Lin Wu, Taipei (TW); Chung-Hao Tsai, Taipei (TW)

(73) Assignee: National Taiwan University, Taipei (TW)

( * ) Notice: Subject to any disclaimer, the term of this patent is extended or adjusted under 35 U.S.C. 154(b) by 437 days.

(21) Appl. No.: 13/015,171

(22) Filed: Jan. 27, 2011

(65) Prior Publication Data

US 2012/0194290 A1 Aug. 2, 2012

(51) Int. Cl.
*H04B 3/28* (2006.01)
*H01P 3/08* (2006.01)

(52) U.S. Cl.
USPC .......... 333/12; 333/246

(58) Field of Classification Search
USPC .......... 333/12, 24 R, 236, 238, 245, 246
See application file for complete search history.

(56) References Cited

U.S. PATENT DOCUMENTS 8,115,568 B2 * 2/2012 Hsu .......... 333/33
8,339,212 B2 * 12/2012 Wu et al. .......... 333/12
8,354,892 B2 * 1/2013 Jeong et al. .......... 333/26
2009/0236141 A1 9/2009 Kim et al.

FOREIGN PATENT DOCUMENTS

TW 200841511 10/2008
TW M385809 U1 8/2010

OTHER PUBLICATIONS

Tsai, Chung-Hao et al., "A Broadband and Miniaturized Common-Mode Filter for Gigahertz Differential Signals Based on Negative-Permittivity Metamaterials." IEEE Transactions on Microwave Theory and Techniques, Jan. 2010, pp. 195-202, vol. 58, No. 1.
Wu, Shu-Jung et al., "A Novel Wideband Common-Mode Suppression Filter for Gigahertz Differential Signals Using Coupled Patterned Ground Structure." IEEE Transactions on Microwave Theory and Techniques, Apr. 2009, vol. 57, No. 4.

* cited by examiner

*Primary Examiner* — Dean O Takaoka
(74) *Attorney, Agent, or Firm* — Muncy, Geissler, Olds & Lowe, PLLC

(57) ABSTRACT

An electromagnetic noise suppression circuit is provided. The suppression circuit comprises a first substrate, a first grounding plane and at least one transmission line. The transmission line is configured on a top surface of the first substrate and the first grounding plane is configured on the bottom surface of the first substrate. The first grounding plane comprises a first distributed coupling structure. The first distributed coupling structure and the transmission line can be equivalent to an inductor-capacitor resonant circuit. The electromagnetic noise within a designated frequency band can be suppressed by the distributed coupling structure of the electromagnetic noise suppression circuit to avoid interfering the signal transmitted by the transmission line and the electromagnetic radiation induced by the electromagnetic noise.

27 Claims, 25 Drawing Sheets

ELECTROMAGNETIC NOISE SUPPRESSION CIRCUIT

1. FIELD OF THE INVENTION

The present invention generally relates to a circuit and, more particularly, to an electromagnetic noise suppression circuit adopting a distributed coupling structure for suppressing electromagnetic noise within a designated frequency band to avoid interfering the signal transmitted by the transmission line and reduce electromagnetic emission resulting from noise.

2. BACKGROUND OF THE INVENTION

With the rapid development of electronic products, problems due to electromagnetic interference (EMI) or common-mode noise get more serious to hinder normal operations as the circuitry becomes more complicated.

Conventionally, EMI at low frequencies is eliminated by adopting electromagnetic materials with high inductance. However, such method is not applicable to high-frequency digital circuits and requires large hardware instrumentality.

Recently, a multi-layered electromagnetic noise suppression circuit (for example, the common-mode electromagnetic noise suppression circuit) has been developed using low/high temperature cofired ceramic (LTCC/HTCC) technology to effectively suppress EMI. However, LTCC/HTCC technology is very costly. Such multi-layered electromagnetic noise suppression circuit is only capable of operating at low frequencies, for example, 750 MHz to 1 GHz.

In view of the above, there is a need in providing an electromagnetic noise suppression circuit that can be easily fabricated by adopting a distributed coupling structure for suppressing electromagnetic noise within a wide frequency band.

SUMMARY OF THE INVENTION

It is one object of the present invention to provide an electromagnetic noise suppression circuit adopting a distributed coupling structure for suppressing electromagnetic noise within a designated frequency band to avoid interfering the signal transmitted by the transmission line and reduce electromagnetic emission resulting from noise.

It is another object of the present invention to provide an electromagnetic noise suppression circuit, wherein the transmission line comprises a bended portion so that the effect of the coupling capacitance between the transmission line and the distributed coupling structure may be enhanced to suppress electromagnetic noise within a broader frequency band.

It is still another object of the present invention to provide an electromagnetic noise suppression circuit, wherein the bended portion of the transmission line may be configured on a plane or among the dielectric layer.

It is still another object of the present invention to provide an electromagnetic noise suppression circuit, wherein the distributed coupling structure comprises a plurality of metal pads so that at least one coupling capacitor is formed respectively between the transmission line and each of the metal pads to suppress electromagnetic noise within a broader frequency band.

It is still another object of the present invention to provide an electromagnetic noise suppression circuit, wherein a distributed coupling structure is configured on both sides of the transmission line, respectively, so that the transmission line and the distributed coupling structures are configured to be equivalent to an inductor-capacitor resonant circuit for suppressing electromagnetic noise within a plurality of designated frequency bands to avoid the electromagnetic radiation induced by the electromagnetic noise.

It is still another object of the present invention to provide an electromagnetic noise suppression circuit, wherein the metal pad of the distributed coupling structures can be electrically connected to a grounding plane, and the metal pad and the grounding plane can be coplanar or non-coplanar.

It is still another object of the present invention to provide an electromagnetic noise suppression circuit, wherein the distributed coupling structure further comprises at least one connecting portion through which the metal pad is connected to the grounding plane, and the connecting portion is a coplanar straight structure, a three-dimensional straight structure, a coplanar zigzag structure or a three-dimensional zigzag structure.

In order to achieve the foregoing objects, the present invention provides an electromagnetic noise suppression circuit, comprising: a first substrate; a first grounding plane configured on the bottom surface of the first substrate and comprising a first distributed coupling structure therein, the first distributed coupling structure comprising: a first defected portion; and at least one first metal pad connected to the first grounding plane through at least one first connecting portion, wherein the first defected portion surrounds at least one of the first metal pad and the first connecting portion; and at least one transmission line configured on the top surface of the first substrate and with respect to the first metal pad so that at least one coupling capacitor is formed between the transmission line and the first metal pad.

The present invention further provides an electromagnetic noise suppression circuit, comprising: a first substrate; a second substrate; a first grounding plane configured on the bottom surface of the first substrate and comprising a first distributed coupling structure therein, the first distributed coupling structure comprising: a first defected portion; a plurality of first connecting portion configured among the second substrate; and a first metal pad surrounded by the first defected portion; a second grounding plane configured on the bottom surface of the second substrate, wherein the first metal pad is connected to the second grounding plane through one of the first connecting portions and the second grounding plane is connected to the first grounding plane through another one of the first connecting portions; and at least one transmission line configured on the top surface of the first substrate and with respect to the first metal pad so that at least one coupling capacitor is formed between the transmission line and the first metal pad.

The present invention further provides an electromagnetic noise suppression circuit, comprising: a first substrate; a second substrate; a first grounding plane configured on the bottom surface of the first substrate and comprising a first distributed coupling structure therein, the first distributed coupling structure comprising: a first defected portion; and a first metal pad surrounded by the first defected portion; a second grounding plane configured on the top surface of the second substrate and comprising a second distributed coupling structure therein, the second distributed coupling structure comprising: a second defected portion; and a second metal pad surrounded by the second defected portion; and at least one transmission line configured between the first substrate and the second substrate and with respect to the first metal pad and the second metal pad so that at least one coupling capacitor is formed between the transmission line and the first metal pad and between the transmission line and the second metal pad, respectively.

BRIEF DESCRIPTION OF THE DRAWINGS

The objects and spirits of the embodiments of the present invention will be readily understood by the accompanying drawings and detailed descriptions, wherein.

DETAILED DESCRIPTION OF THE PREFERRED EMBODIMENTS

The present invention can be exemplified but not limited by various embodiments as described hereinafter.

Figure 1A:
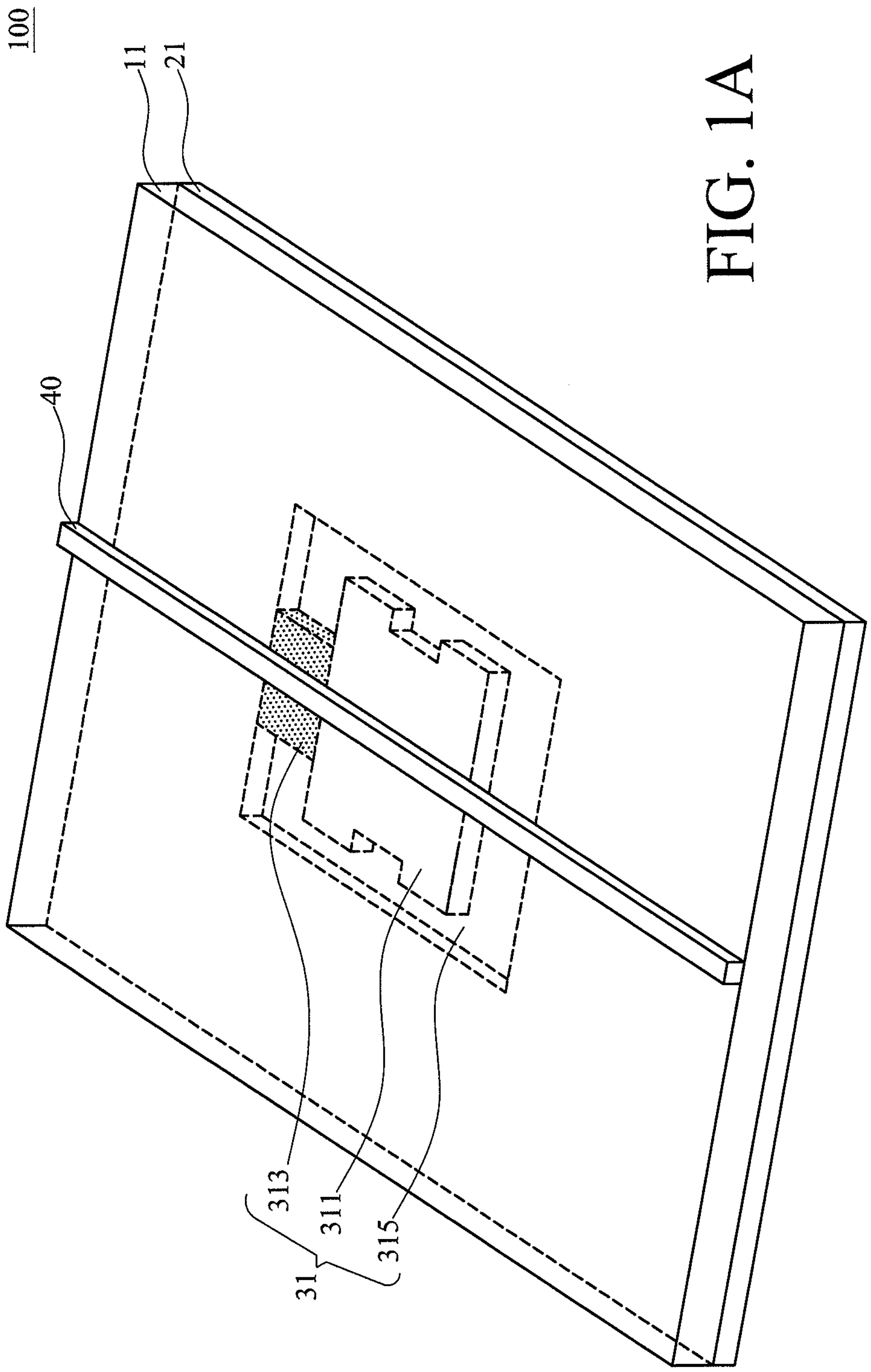
FIG. 1A to FIG. 1C depict respectively a stereogram, a top-view diagram and a cross-sectional diagram of an electromagnetic noise suppression circuit according to one embodiment of the present invention.
Figure 1B:
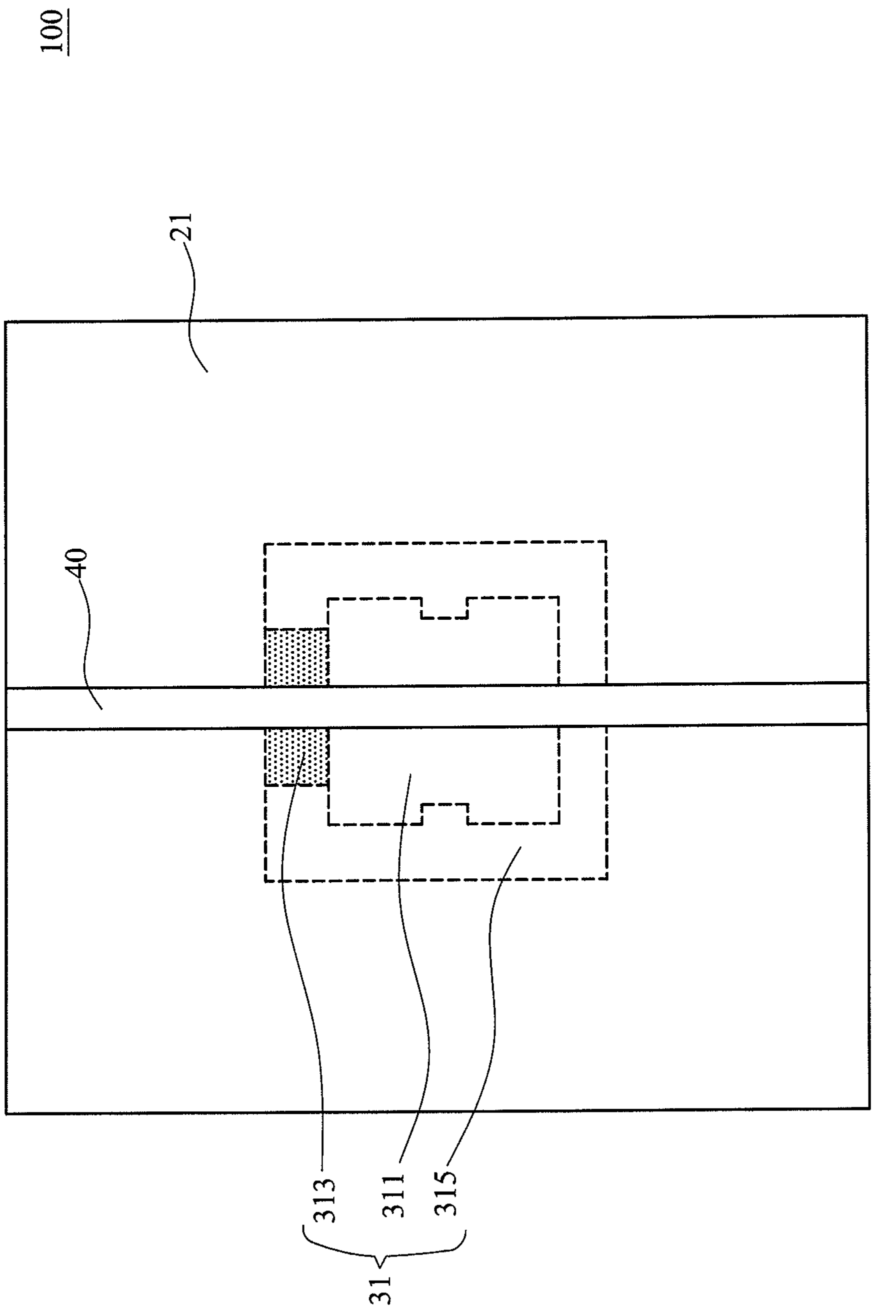
Figure 1C:
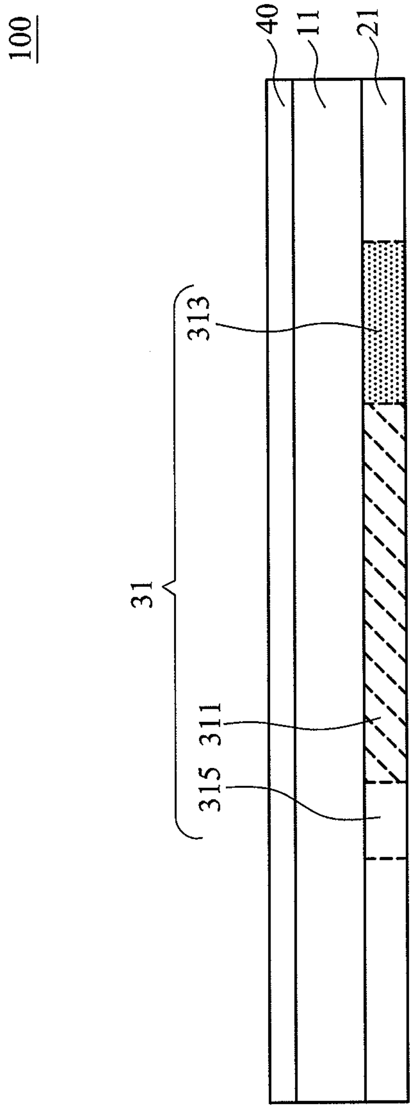

Please refer to FIG. 1A, FIG. 1B and FIG. 1C, which depict respectively a stereogram, a top-view diagram and a cross-sectional diagram of an electromagnetic noise suppression circuit according to one embodiment of the present invention. As shown in these drawings, the electromagnetic noise suppression circuit 100 of the present embodiment comprises a first substrate 11, a first grounding plane 21 and at least one transmission line 40.

Wherein the first grounding plane 21 is configured on the bottom surface of the first substrate 11 and comprises a first distributed coupling structure 31. The first distributed coupling structure 31 is formed by etching the first grounding plane 21.

The first distributed coupling structure 31 comprises a first metal pad 311, a first connecting portion 313 and a first defected portion 315 (also referred to as the hollow portion). The first grounding plane 21 is etched to form the first defected portion 315 of the first distributed coupling structure 31 according to at least one of the shape of the first metal pad 311 and the length of the first connecting portion 313. The first defected portion 315 surrounds at least one of the first metal pad 311 and the first connecting portion 313. The first metal pad 311 is connected to the first grounding plane 21 through the first connecting portion 313. Hereby, the first connecting portion 313 is regarded as a grounding inductor. The first connecting portion 313, the first metal pad 311 and the first grounding plane 21 are coplanar, and the first connecting portion 313 is realized by a coplanar straight structure.

The transmission line 40 is a long, straight and planar microstrip line, which is configured on the top surface of the first substrate 11 and with respect to the perpendicular extension position of the first metal pad 311 of the first distributed coupling structure 31 so that at least one coupling capacitor is formed between the transmission line 40 and the first metal pad 311. The transmission line 40 and the first distributed coupling structure 31 can be configured to be equivalent to an inductor-capacitor (LC) resonant circuit. The LC resonant circuit is capable of suppressing electromagnetic noise within a designated frequency band to avoid interfering the signal transmitted by the transmission line 40.

Moreover, the first metal pad 311 of the present embodiment is H-shaped. In addition, the first metal pad 311 can also be rectangular, circular, or any other shape according to the shape and size of the first metal pad 311 with respect to the desired resonant frequency of the LC resonant circuit.

Figure 1D:
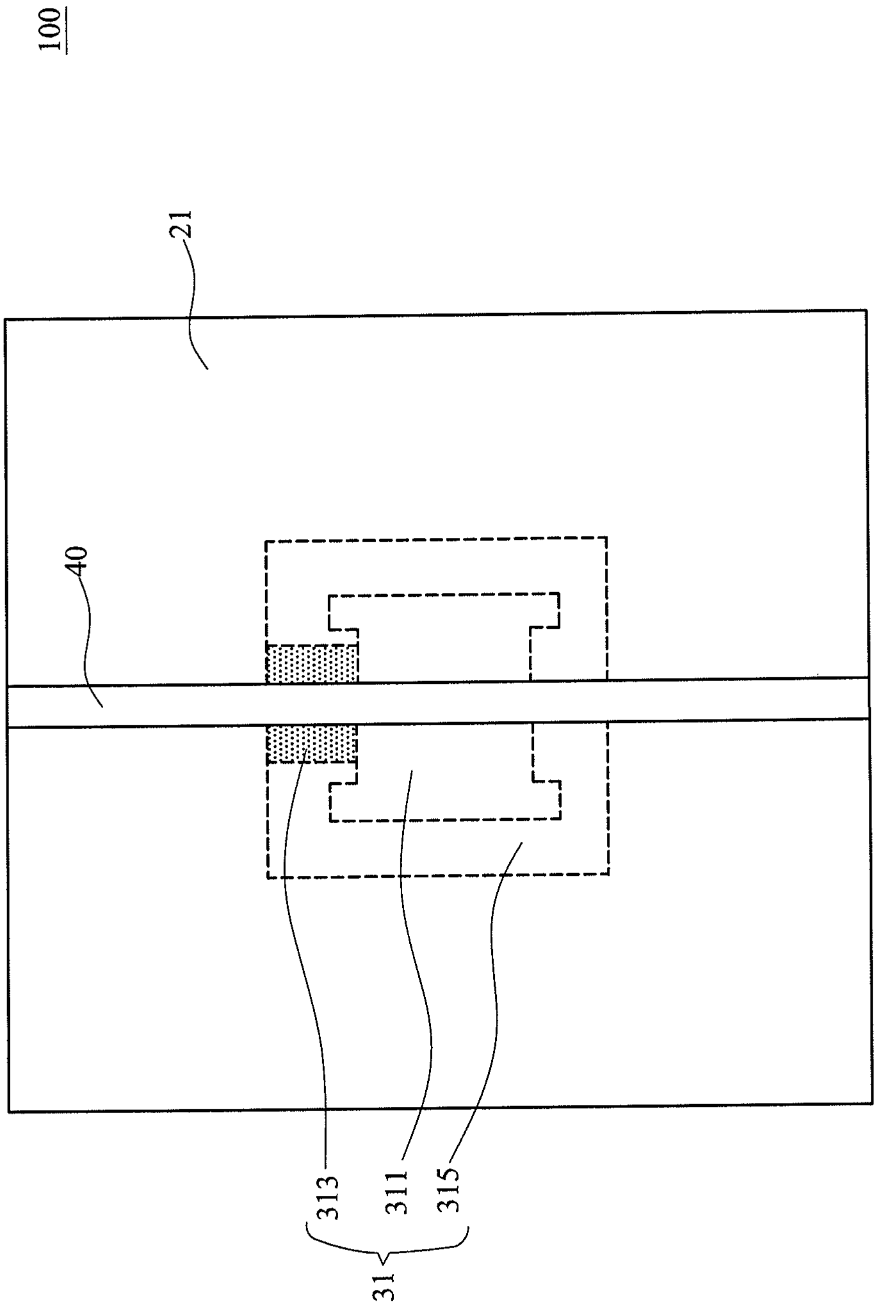
FIG. 1D depicts a top-view diagram of an electromagnetic noise suppression circuit according to another embodiment of the present invention.

For example, the first connecting portion 313 of the present embodiment can be configured on the lateral side of the H-shaped first metal pad 311, as shown in FIG. 1B, or in the notch of the H-shaped first metal pad 311, as shown in FIG. 1D.

Figure 1E:
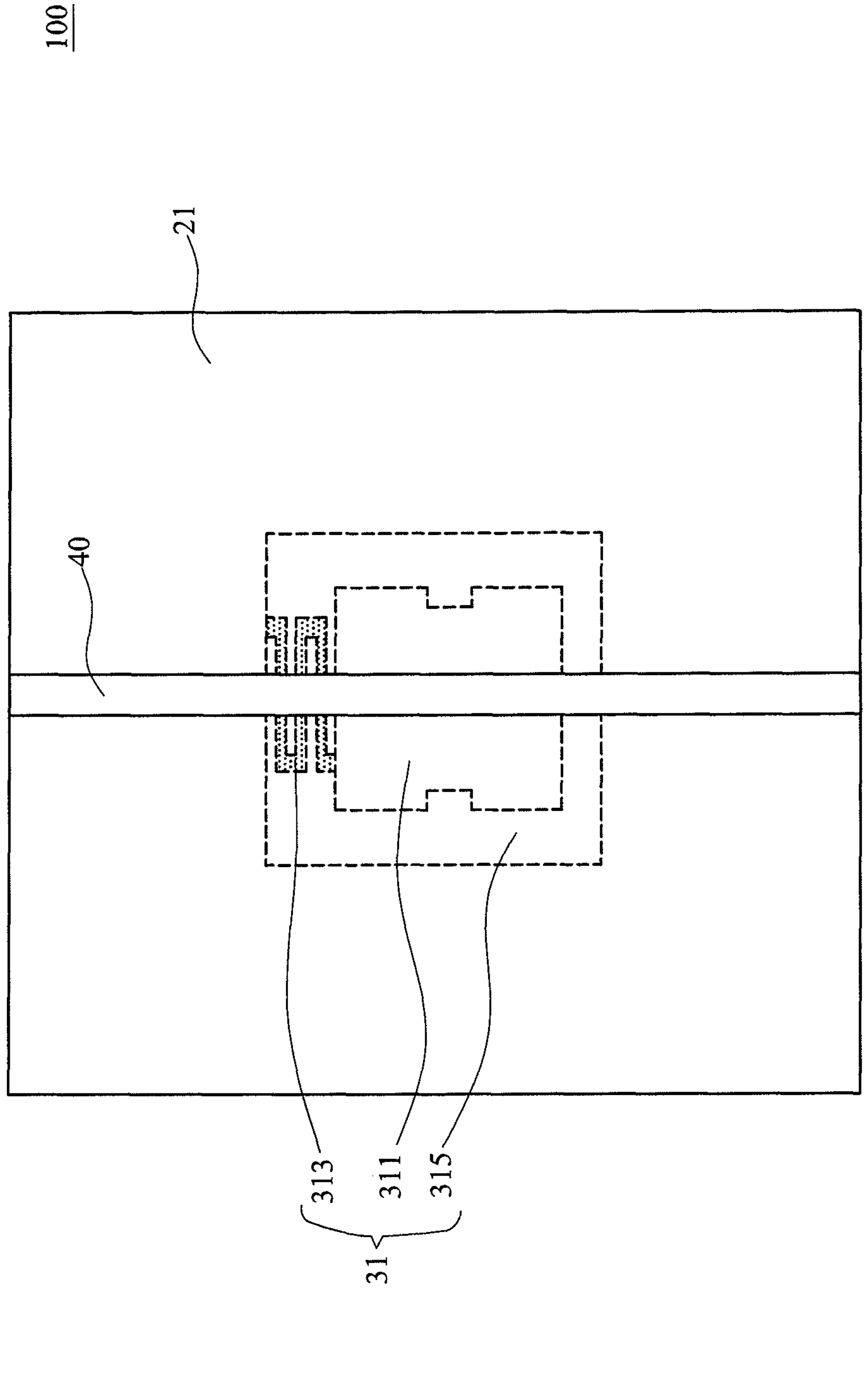
FIG. 1E depicts a top-view diagram of an electromagnetic noise suppression circuit according to another embodiment of the present invention.

As shown in FIG. 1E, in another embodiment of the present invention, the first connecting portion 313 can be a coplanar zigzag structure (for example, a meandered structure) in addition to a coplanar straight structure.

Figure 1F:
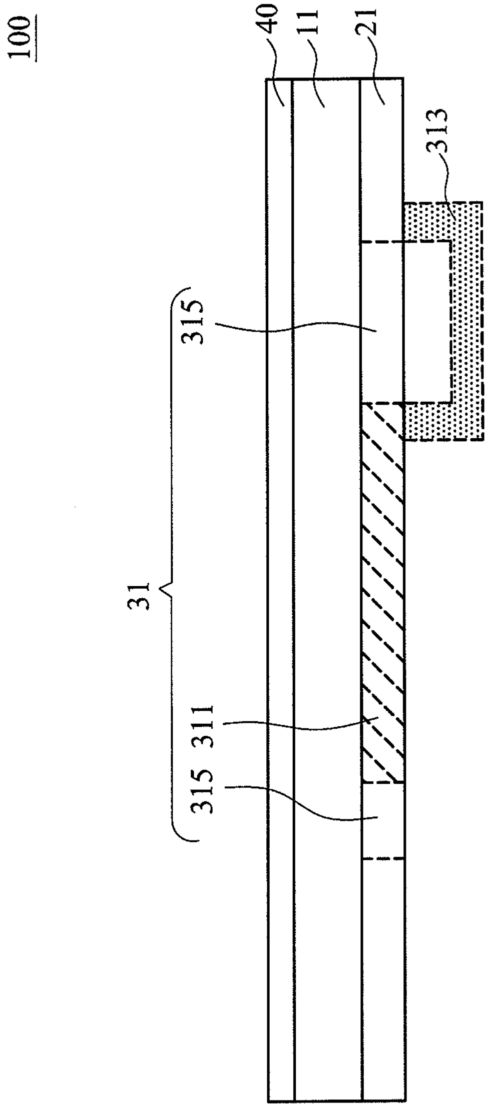
FIG. 1F depicts a cross-sectional diagram of an electromagnetic noise suppression circuit according to another embodiment of the present invention.

As shown in FIG. 1F, in another embodiment of the present invention, the first connecting portion 313 can be a three-dimensional zigzag structure (for example, a ㄇ-shaped structure) configured on the bottom surface of the first grounding plane 21.

Figure 1G:
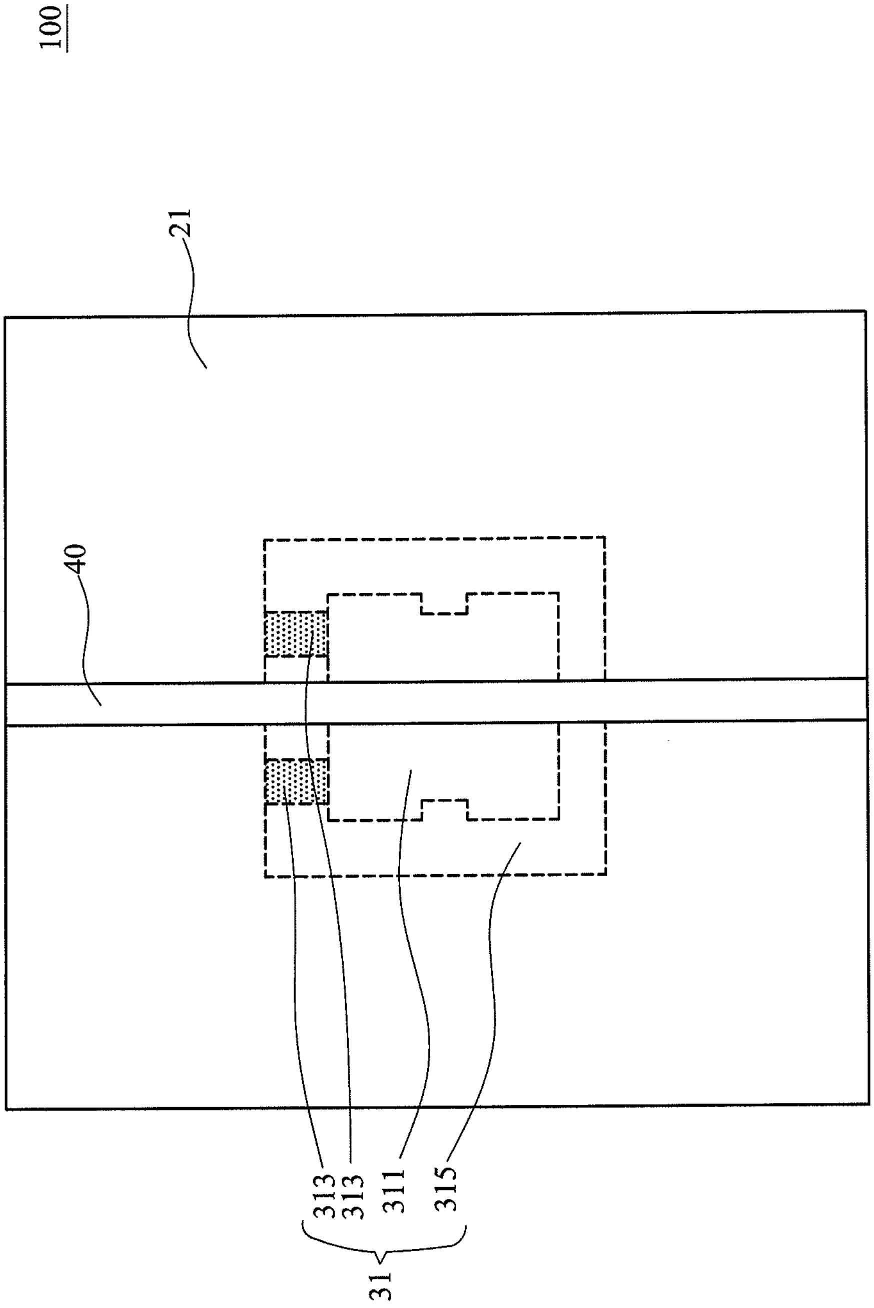
FIG. 1G depicts a top-view diagram of an electromagnetic noise suppression circuit according to another embodiment of the present invention.

In the present invention, the first metal pad 311 is connected to the first grounding plane 21 through a single first connecting portion 313. Alternatively, as shown in FIG. 1G, the first metal pad 311 can be connected to the first grounding plane 21 through multiple connecting portions 313.

Figure 1H:
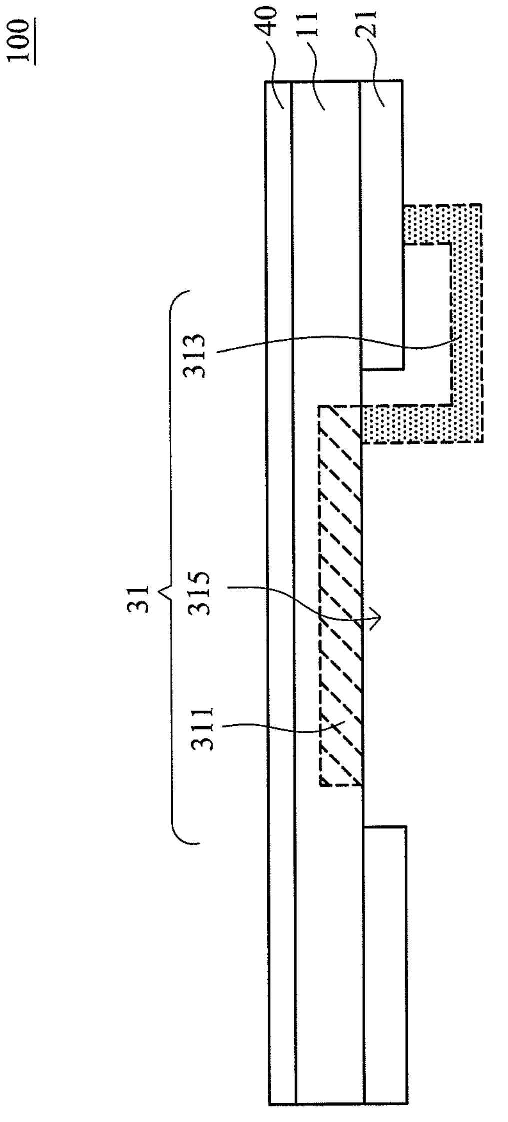
FIG. 1H depicts a cross-sectional diagram of an electromagnetic noise suppression circuit according to another embodiment of the present invention.

Moreover, as shown in FIG. 1H, in another embodiment of the present invention, the first metal pad 311 and the first grounding plane 21 can be non-coplanar. For example, the first metal pad 311 is configured within the substrate 11 and is connected to the first grounding plane 21 through the first connecting portion 313.

Figure 2A:
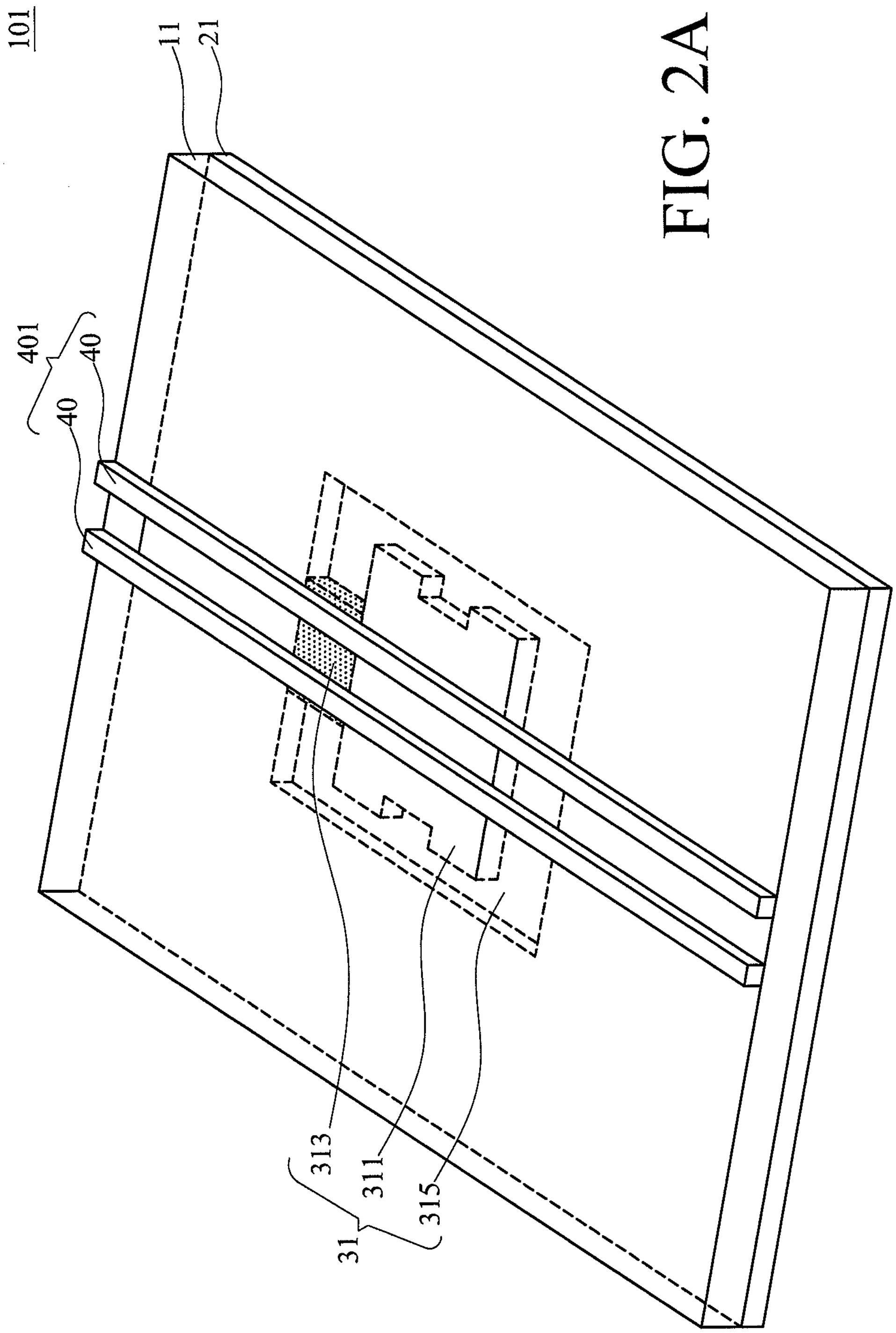
FIG. 2A and FIG. 2B depict respectively a stereogram and a top-view diagram of an electromagnetic noise suppression circuit according to another embodiment of the present invention.
Figure 2B:
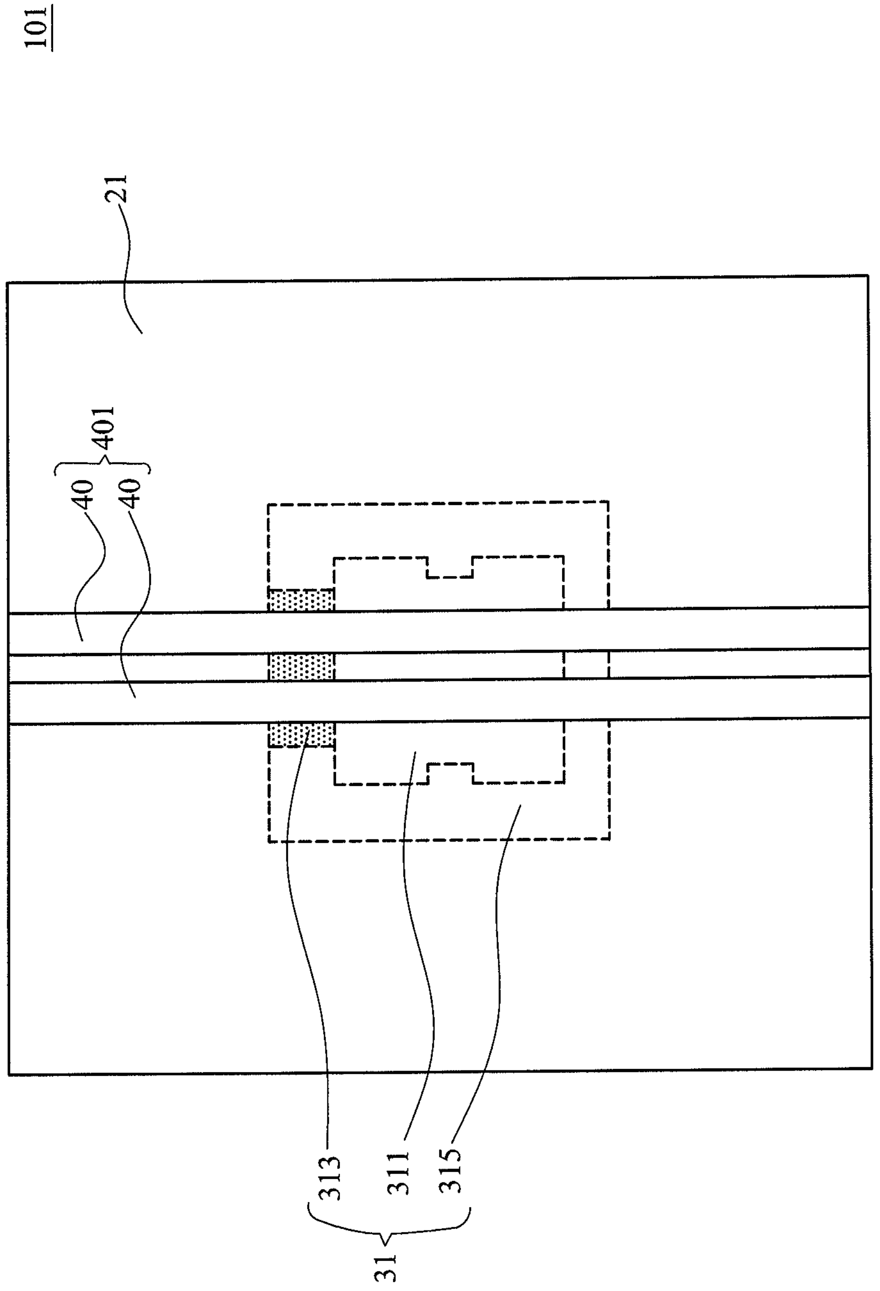

Please refer to FIG. 2A and FIG. 2B, which depict respectively a stereogram and a top-view diagram of an electromagnetic noise suppression circuit according to another embodiment of the present invention. In addition to the usage of a single transmission line 40, the electromagnetic noise suppression circuit 101 can also use multiple transmission wires 40, for example, at least two transmission wires. In the present embodiment, a pair of coupled transmission wires 401 may be consisted of two transmission lines 40. Moreover, the coupled transmission wires 401 and the first distributed coupling structure 31 may be configured to be equivalent to an inductor-capacitor (LC) resonant circuit. Considering differential transmission applications, a differential-mode signal and a common-mode signal may be generated on the coupled transmission wires 401. The differential-mode signal may be a data signal or a control signal, while the common-mode signal may be a common-mode electromagnetic noise.

In the present embodiment, the coupled transmission wires 401 and the first distributed coupling structure 31 may be configured to be equivalent to an inductor-capacitor resonant circuit capable of suppressing or filtering out the common-mode signal with a designated frequency band to avoid the differential-mode signal influenced by the common-mode signal.

Furthermore, in the present invention, even though a single transmission line 40 is used to exemplify these embodiments, those with ordinary skills in the art should understand that the usage of multiple transmission lines 40 can be adopted in these embodiments. Thus, descriptions thereof are not to be presented herein.

Figure 3:
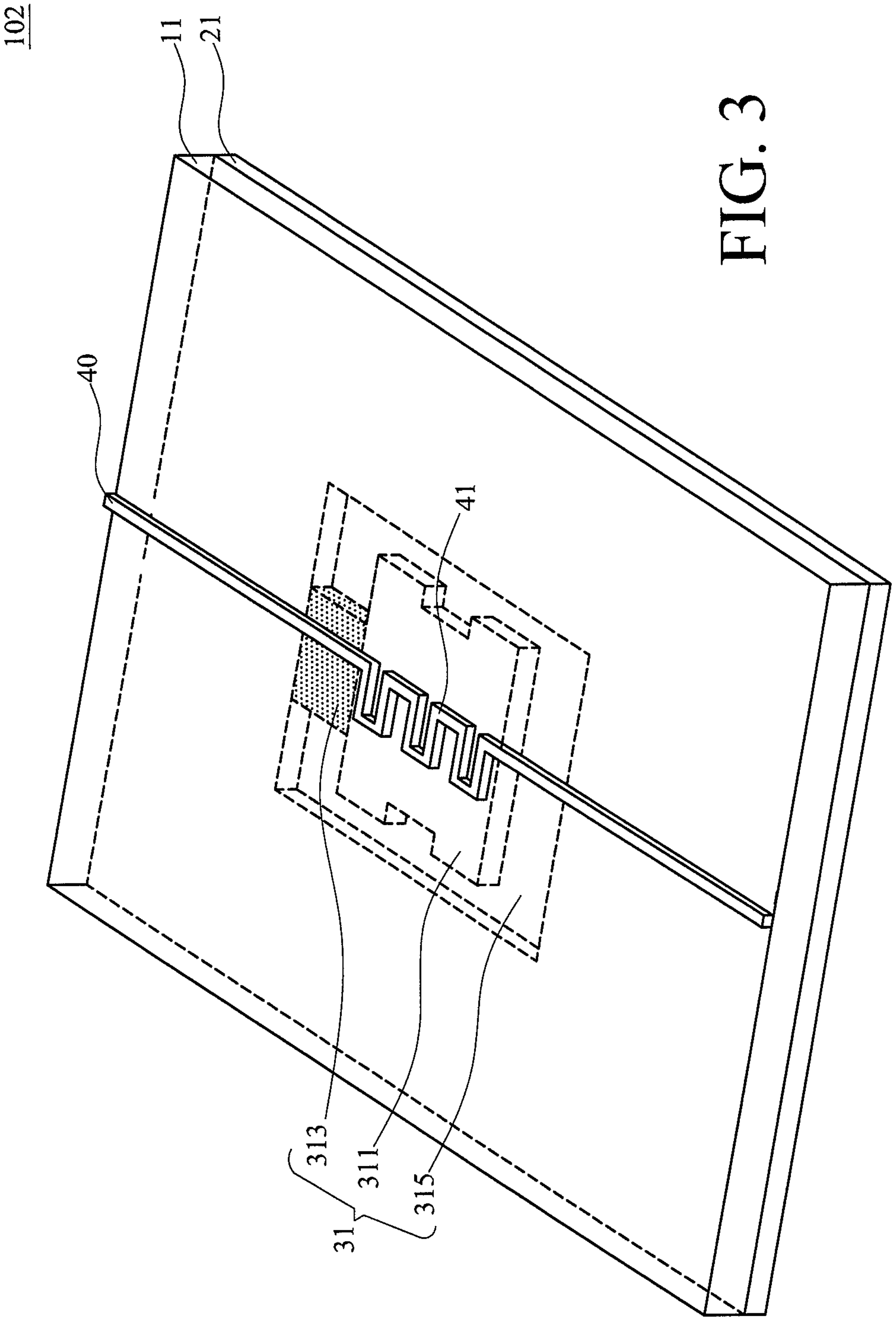
FIG. 3 depicts a stereogram of an electromagnetic noise suppression circuit according to another embodiment of the present invention.

Please refer to FIG. 3, which depicts a stereogram of an electromagnetic noise suppression circuit according to another embodiment of the present invention. As shown in the FIG. 3, the transmission line 40 comprises a bended portion 41, which is configured on the top surface of the first substrate 11 and with respect to the perpendicular extension position of the first metal pad 311 of the first distributed coupling structure 31. With the use of the bended portion 41, the effect of the coupling capacitance between the transmission line 40 and the first metal pad 311 may be enhanced to further suppress electromagnetic noise with a broader frequency band.

Moreover, in the present invention, the number of segments and bending angles in the bended portion 41 may be varied so as to change the coupling capacitance between the transmission line 40 and the first metal pad 311. Thereby, the resonant frequency of the LC resonant circuit may be adjusted to suppress electromagnetic noise within the designated frequency band.

Figure 4:
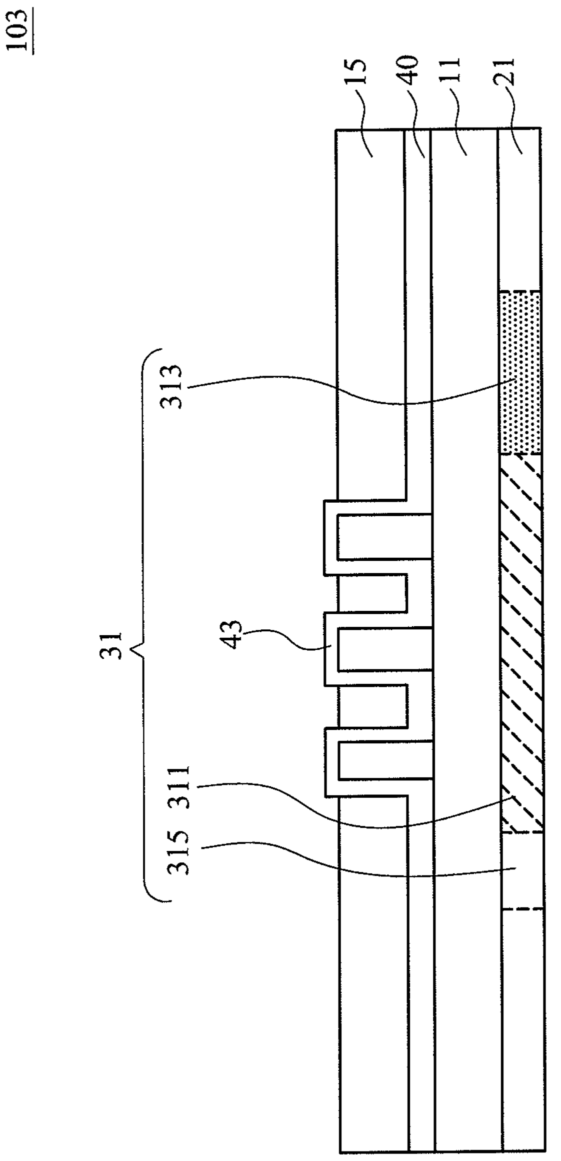
FIG. 4 depicts a cross-sectional diagram of an electromagnetic noise suppression circuit according to another embodiment of the present invention.

Please refer to FIG. 4, which depicts a cross-sectional diagram of an electromagnetic noise suppression circuit according to another embodiment of the present invention. The electromagnetic noise suppression circuit 103 of the present embodiment further comprises a dielectric layer 15 configured on the transmission line 40. The dielectric layer 15 and the first substrate 11 are made of the same material or not, for example, FR4.

Unlike the embodiment of FIG. 3 wherein the bended portion 41 and the transmission line 40 are configured coplanarly on the top surface of the first substrate 11, in the present embodiment, the bended portion 43 and the transmission line 40 are configured non-coplanarly and the bended portion 43 is formed in a vertical zigzag fashion among the dielectric layer 15 so as to enhance the effect of the coupling capacitance between the transmission line 40 and the first metal pad 311.

Figure 5A:
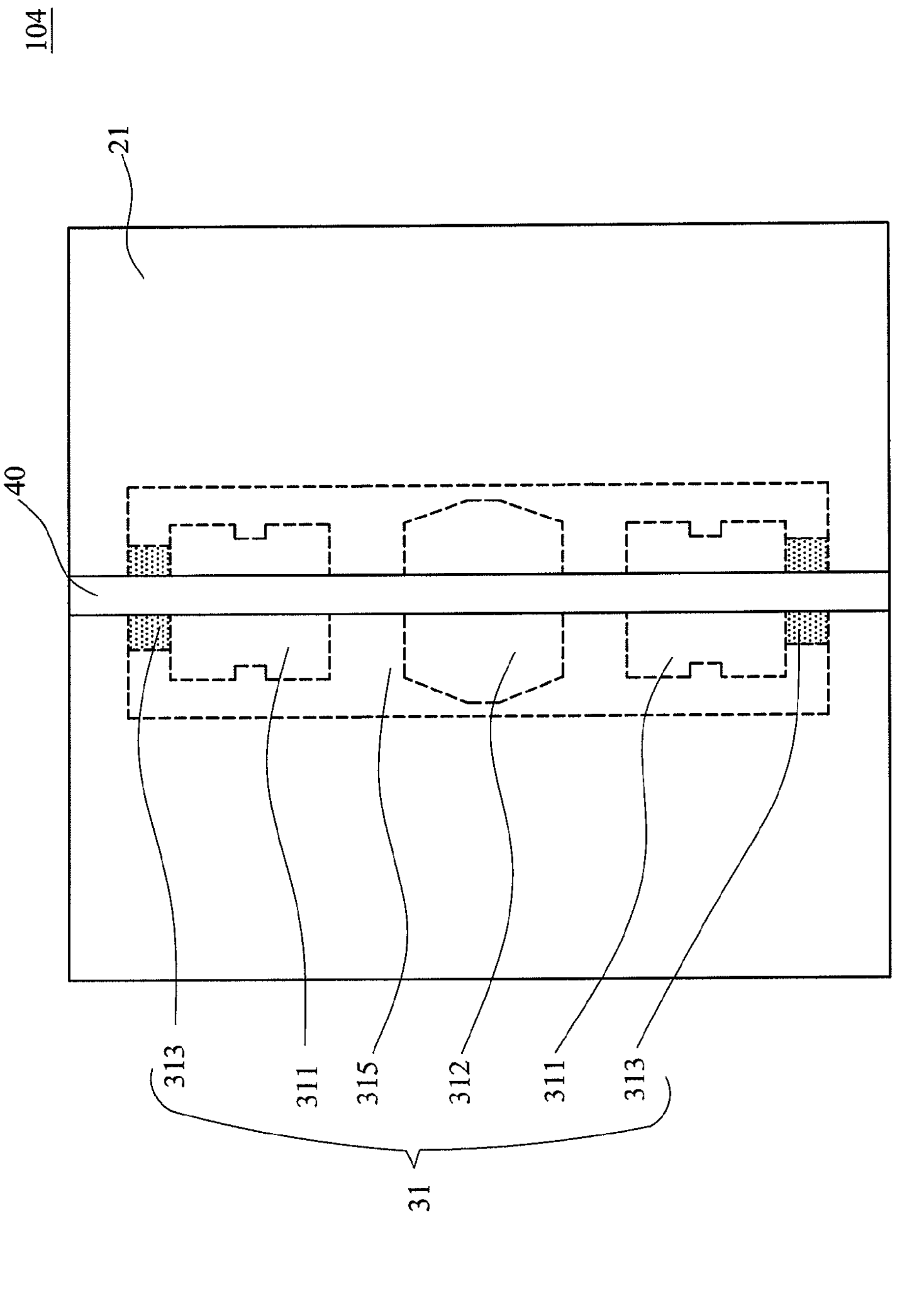
FIG. 5A and FIG. 5B depict respectively a top-view diagram and a cross-sectional diagram of an electromagnetic noise suppression circuit according to another embodiment of the present invention.
Figure 5B:
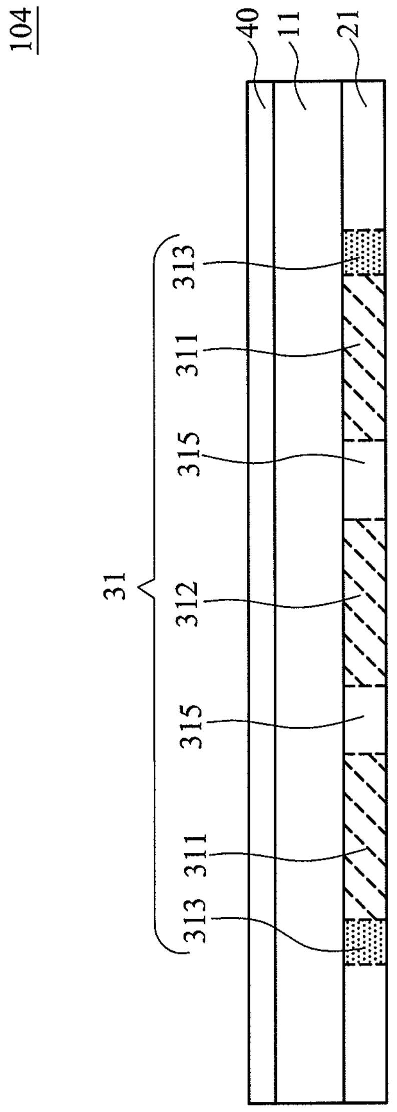

Please refer to FIG. 5A and FIG. 5B, which depict respectively a top-view diagram and a cross-sectional diagram of an electromagnetic noise suppression circuit according to another embodiment of the present invention. As shown in these drawings, the first distributed coupling structure 31 further comprises a plurality of first metal pads 311 and at least one second metal pad 312. Each of the first metal pads 311 is connected to the first grounding plane 21 through a corresponding first connecting portion 313, respectively. The second metal pad 312 is not electrically connected to the first grounding plane 21. Accordingly, the first connecting portion 313 is regarded as a grounding inductor.

The first grounding plane 21 is etched to form the first defected portion 315 of the first distributed coupling structure 31 according to at least one of the shapes of the first metal pads 311, the shape of the second metal pad 312 and the length of the first connecting portion 313. The first defected portion 315 surrounds the first metal pads 311, the second metal pad 312 and the first connecting portion 313.

A plurality of coupling capacitors are formed between the transmission line 40 and metal pads 311 and 312 so as to change the capacitance and resonant frequency of the equivalent LC resonant circuit between the transmission line 40 and the first distributed coupling structure 31 to suppress electromagnetic noise within a broader frequency band.

In one embodiment of the present invention, the first metal pads 311 are formed in the same shape while the second metal pad 312 is formed in another shape. Alternatively, in another embodiment of the present invention, the first metal pads 311 are formed in various shapes. Alternatively, the first metal pads 311 and the second metal pad 312 are all formed in the same shape.

Figure 6A:
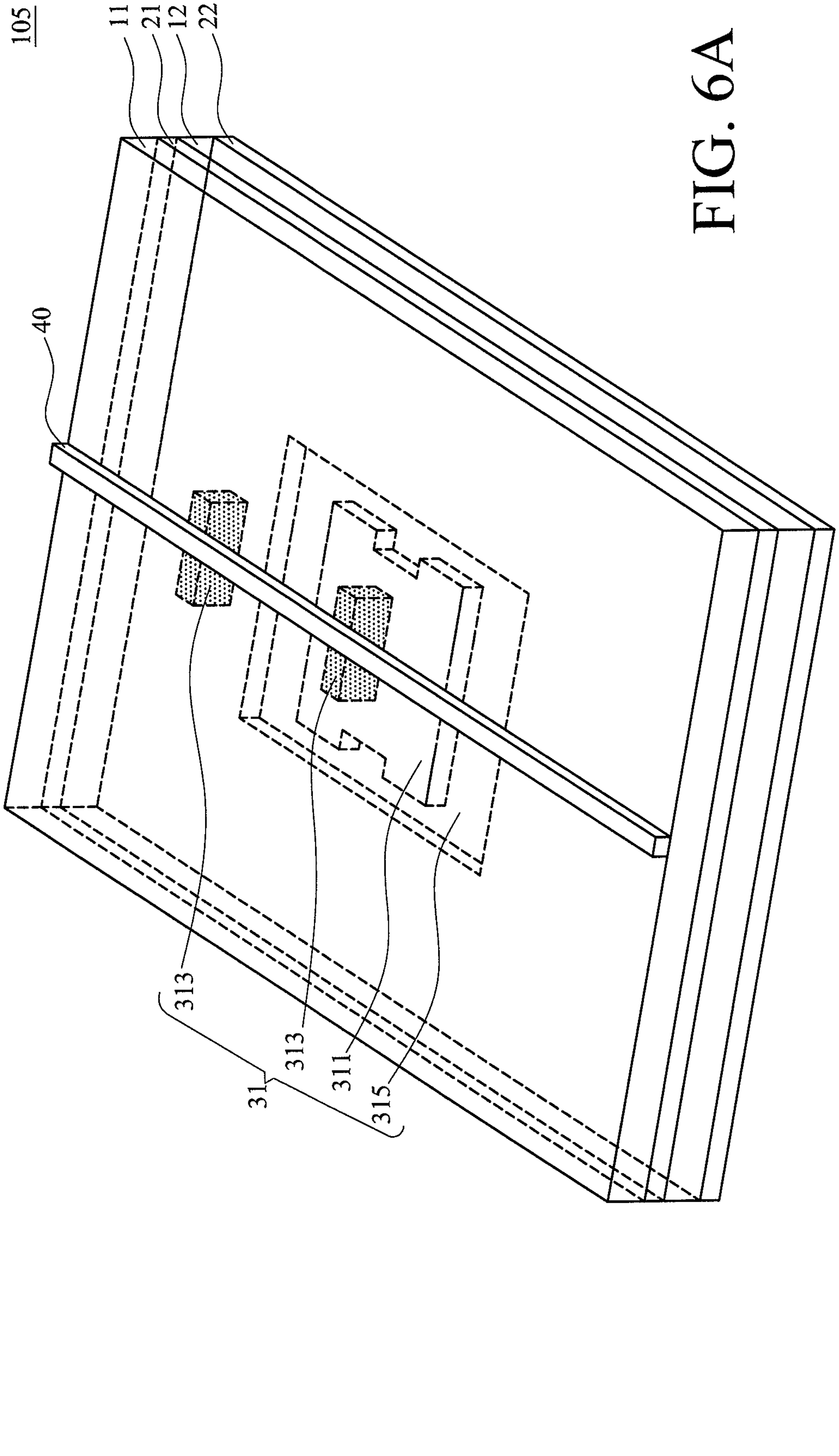
FIG. 6A and FIG. 6B depict respectively a stereogram diagram and a cross-sectional diagram of an electromagnetic noise suppression circuit according to another embodiment of the present invention.
Figure 6B:
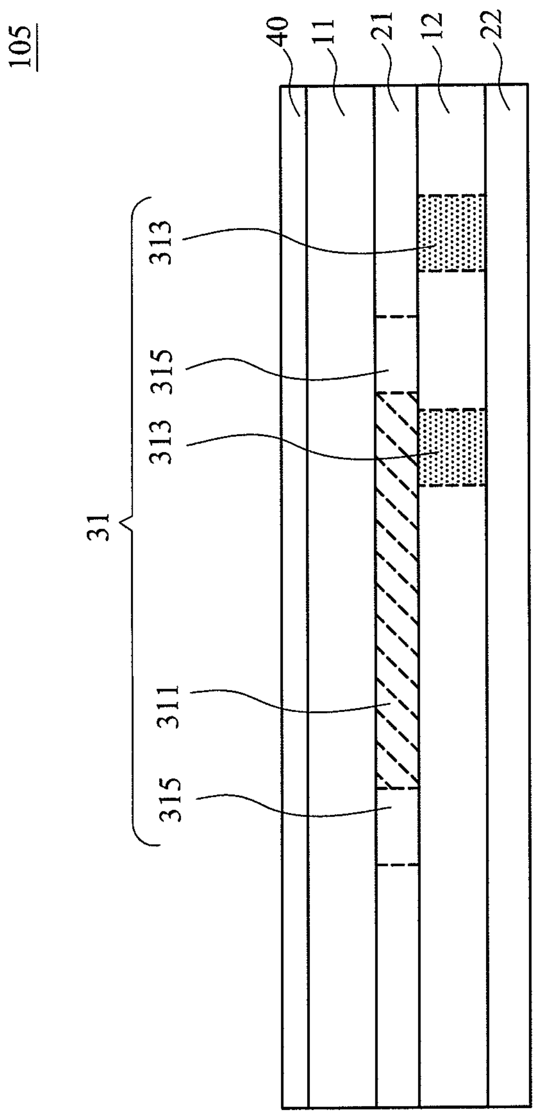

Please refer to FIG. 6A and FIG. 6B, which depict respectively a stereogram and a cross-sectional diagram of an electromagnetic noise suppression circuit according to one embodiment of the present invention. As shown in these drawings, the electromagnetic noise suppression circuit 105 of the present invention comprises a first substrate 11, a second substrate 12, a first grounding plane 21, a second grounding plane 22 and at least one transmission line 40.

Wherein the first grounding plane 21 is configured on the bottom surface of the first substrate 11 and comprises a first distributed coupling structure 31. The first distributed coupling structure 31 is formed by etching the first grounding plane 21. The first distributed coupling structure 31 comprises a first metal pad 311 and a first defected portion 315. The first grounding plane 21 is etched to form the first defected portion 315 of the distributed coupling structure 31 according to the shape of the first metal pad 311 so that the first defected portion 315 surrounds the first metal pad 311.

Subsequently, the second substrate 12 and the second grounding plane 22 are configured on the bottom surface of the first grounding plane 21 in order. The first distributed coupling structure 31 comprises a plurality of first connecting portion 313 configured among the second substrate 12. Wherein the first metal pad 311 is connected to the second grounding plane 22 through one of the first connecting portions 313 and the second grounding plane 22 is connected to the first grounding plane 21 through another one of the first connecting portions 313. Moreover, the first connecting portions 313 are a three-dimensional straight structure or a three-dimensional zigzag structure.

Comparing with the above embodiment wherein the first metal pad 311 and the first grounding plane 21 electrically connected thereto being coplanarly configured (for example, the first metal pad 311 and the first grounding plane 21 are all configured on the bottom surface of the first substrate 11), in the present embodiment, the first metal pad 311 and the first grounding plane 21 electrically connected thereto may be non-coplanarly configured.

In the present embodiment, the transmission line 40 is similarly configured on the top surface of the first substrate 11 and with respect to the perpendicular extension position of the first metal pad 311 of the first distributed coupling structure 31 so that at least one coupling capacitor is formed between the transmission line 40 and the first metal pad 311. The transmission line 40 and the first distributed coupling structure 31 can be configured to be equivalent to an inductor-capacitor (LC) resonant circuit. The LC resonant circuit is capable of suppressing electromagnetic noise within a designated frequency band to avoid interfering the signal or the data transmitted by the transmission line 40.

Moreover, the transmission line 40 of the present embodiment may comprise a bended portion (not shown), which is similar to the bended portion 41/43 in FIG. 3 or FIG. 4 to enhance the effect of the coupling capacitance between the transmission line 40 and the first metal pad 311.

Figure 7A:
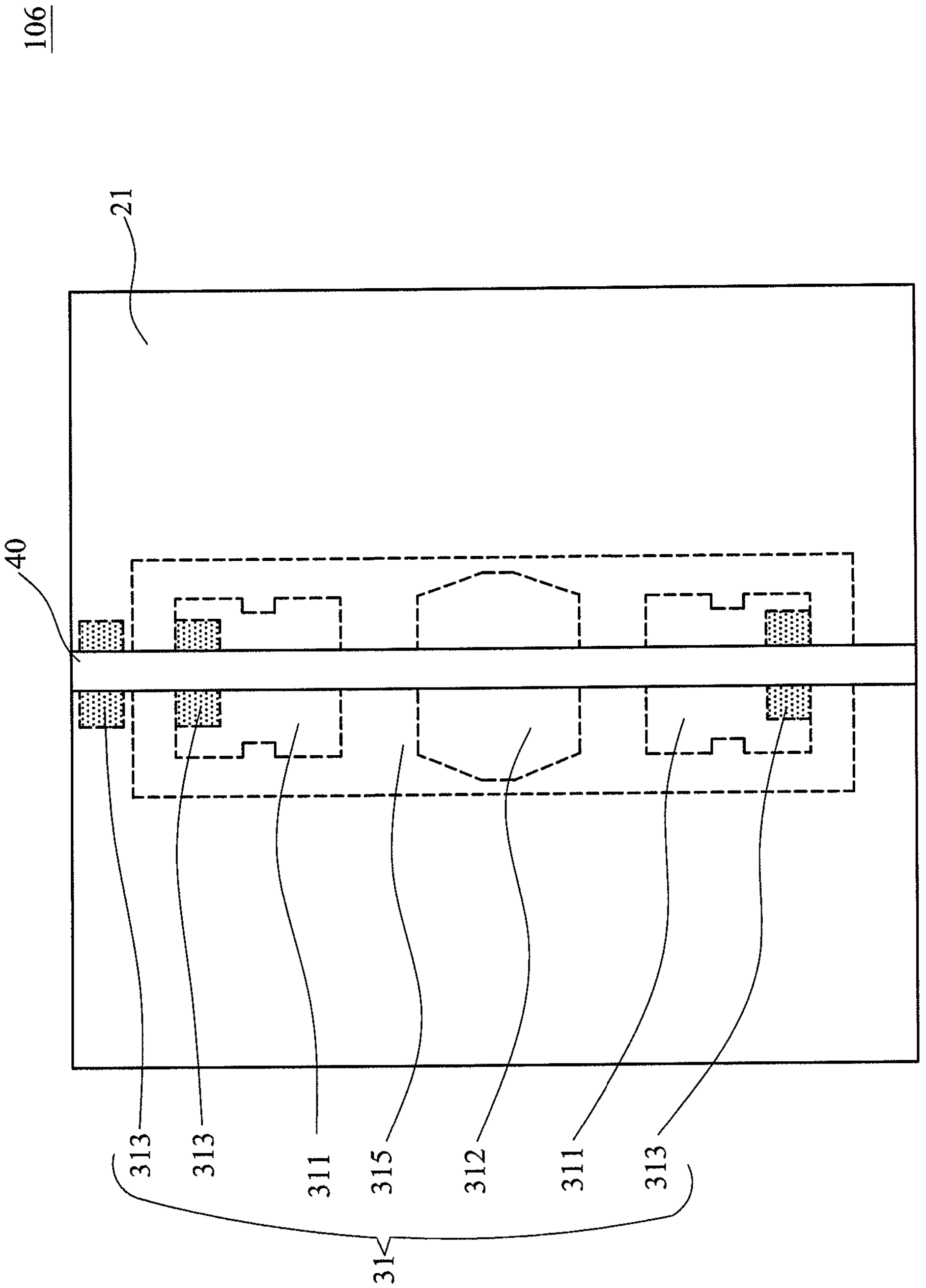
FIG. 7A and FIG. 7B depict respectively a top-view diagram and a cross-sectional diagram of an electromagnetic noise suppression circuit according to another embodiment of the present invention.
Figure 7B:
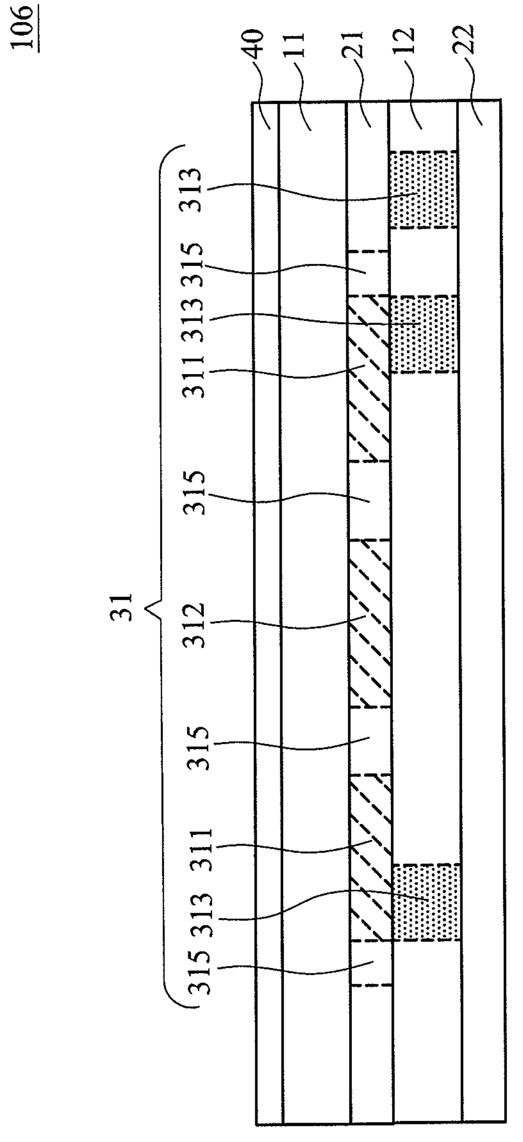

Please refer to FIG. 7A and FIG. 7B, which depict respectively a top-view diagram and a cross-sectional diagram of an electromagnetic noise suppression circuit according to another embodiment of the present invention. Compared to the embodiment of FIGS. 6A and 6B, the first distributed coupling structure 31 of the electromagnetic noise suppression circuit 106 of the present embodiment further comprises a plurality of first metal pads 311 and at least one second metal pad 312.

The first grounding plane 21 is etched to form the first defected portion 315 of the first distributed coupling structure 31 according to at least one of the shapes of the first metal pads 311 and the second metal pad 312. The first defected portion 315 surrounds the first metal pads 311 and the second metal pad 312.

Each of the first metal pads 311 is respectively connected to the second grounding plane 22 through a corresponding first connecting portion 313 that are configured among the second substrate 12. The second metal pad 312 is not electrically connected to the second grounding plane 22. Accordingly, each of the first connecting portions 313 is regarded as a grounding inductor.

In the present embodiment, the first distributed coupling structure 31 comprises multiple the metal pads 311 and 312. A plurality of coupling capacitors are formed between the transmission line 40 and metal pads 311 and 312 so as to change the capacitance and resonant frequency of the equivalent LC resonant circuit between the transmission line 40 and the first distributed coupling structure 31 so that the suppression circuit 106 can be used for suppressing electromagnetic noise within a broader frequency band.

Figure 8A:
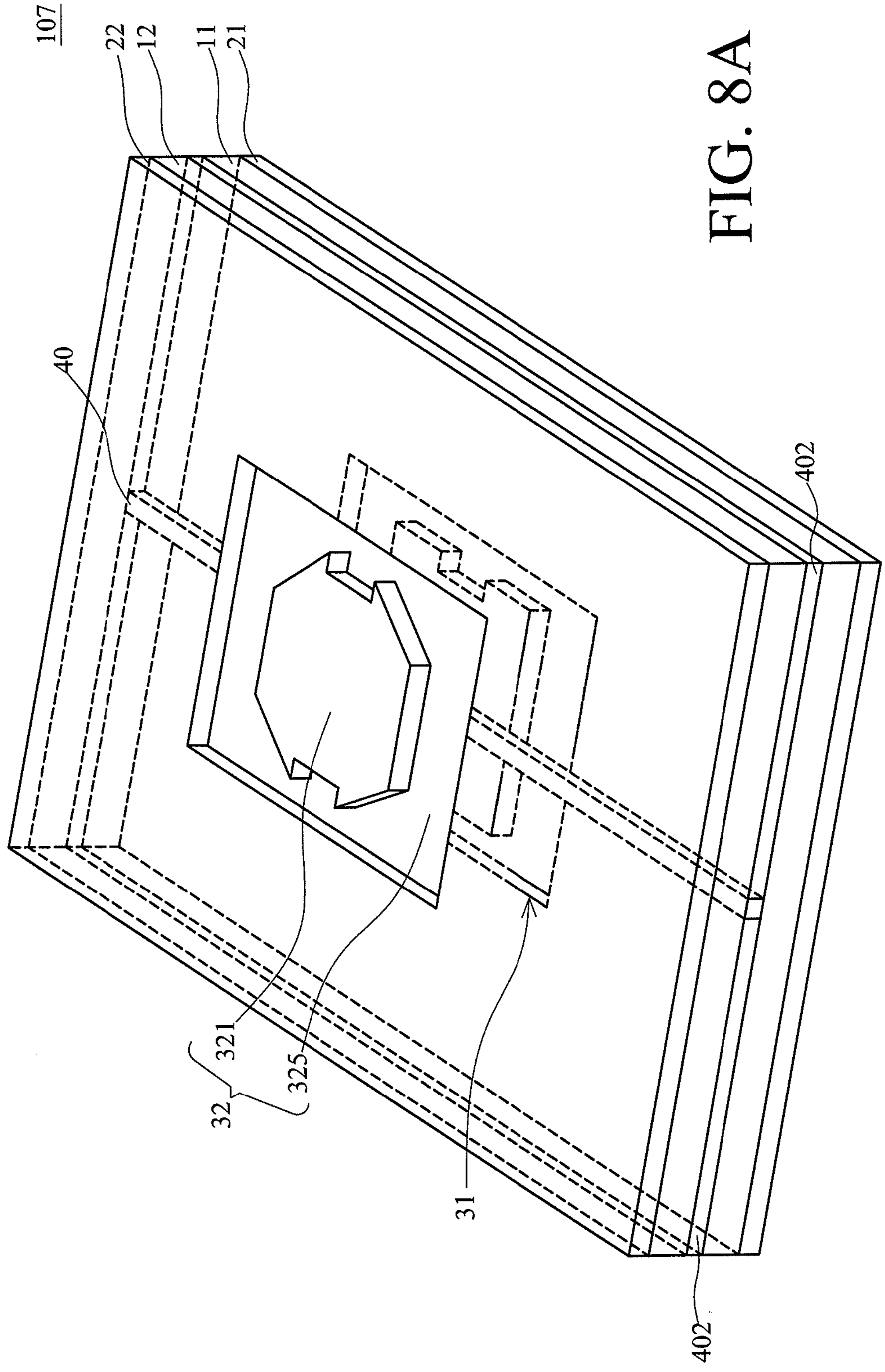
FIG. 8A and FIG. 8B depict respectively a stereogram diagram and a cross-sectional diagram of an electromagnetic noise suppression circuit according to another embodiment of the present invention.
Figure 8B:
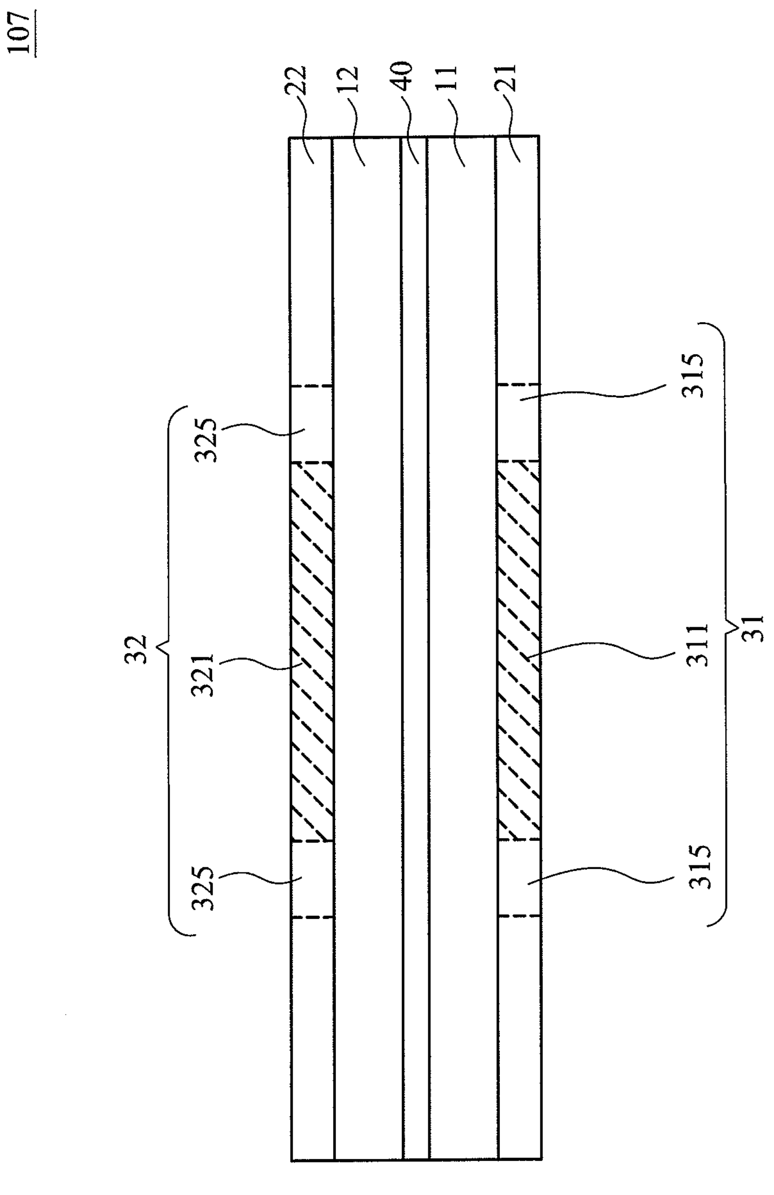

Please refer to FIG. 8A and FIG. 8B, which depict respectively a stereogram and a cross-sectional diagram of an electromagnetic noise suppression circuit according to another embodiment of the present invention. As shown in these drawings, the electromagnetic noise suppression circuit 107 of the present embodiment comprises a first substrate 11, a second substrate 12, a first grounding plane 21, a second grounding plane 22 and at least one transmission line 40. In the present embodiment, the transmission line 40 is a strip line.

Wherein the first grounding plane 21 is configured on the bottom surface of the first substrate 11 and comprises a first distributed coupling structure 31. The first distributed coupling structure 31 is formed by etching the first grounding plane 21. The first distributed coupling structure 31 comprises a first metal pad 311 and a first defected portion 315. The first grounding plane 21 is etched to form the first defected portion 315 of the distributed coupling structure 31 according to the shape of the first metal pad 311. The first defected portion 315 surrounds the first metal pad 311.

The second grounding plane 22 is configured on the top surface of the second substrate 12 and comprises a second distributed coupling structure 32. The second distributed coupling structure 32 is formed by etching the second grounding plane 22. The second distributed coupling structure 32 comprises a second metal pad 321 and a second defected portion 325. The second grounding plane 22 is etched to form the second defected portion 325 of the second distributed coupling structure 32 according to the shape of the second metal pad 321. The second defected portion 325 surrounds the second metal pad 321.

At least one transmission line 40 is configured between the first substrate 11 and the second substrate 12 and with respect to the perpendicular extension position of the first metal pad 311 and the second metal pad 321 so that at least one coupling capacitor is formed between the transmission line 40 and the first metal pad 311 and between the transmission line 40 and the second metal pad 321.

The electromagnetic noise suppression circuit 107 of the present embodiment is a sandwiched structure. Distributed coupling structures 31 and 32 are configured on both sides of the transmission line 40, respectively. Thereby, the transmission line 40 and the first distributed coupling structure 31 are configured to be equivalent to a resonant circuit, while the transmission line 40 and the second distributed coupling structure 32 are configured to be equivalent to another resonant circuit. With the use of multiple resonant circuits, the electromagnetic noise suppression circuit 107 is capable of suppressing electromagnetic noise within a plurality of designated frequency bands.

Moreover, in the present embodiment, the first metal pad 311 of the first distributed coupling structure 31 and the second metal pad 321 of the second distributed coupling structure 32 may be formed in the same shape or in various shapes.

Moreover, the transmission line 40 of the present embodiment may comprise a bended portion (not shown), which is similar to the bended portion 41/43 in FIG. 3 or FIG. 4 to enhance the coupling capacitance between the transmission line 40 and the first metal pad 311 and between the transmission line 40 and the second metal pad 321.

Moreover, the electromagnetic noise suppression circuit 107 of the present embodiment may further comprise a dielectric layer 402 between the first substrate 11 and the second substrate 12 where the transmission line 40 does not occupy. Thereby, the flatness of the whole structure of the electromagnetic noise suppression circuit 107 can be improved and the difficulty in manufacture can be reduced.

Figure 9A:
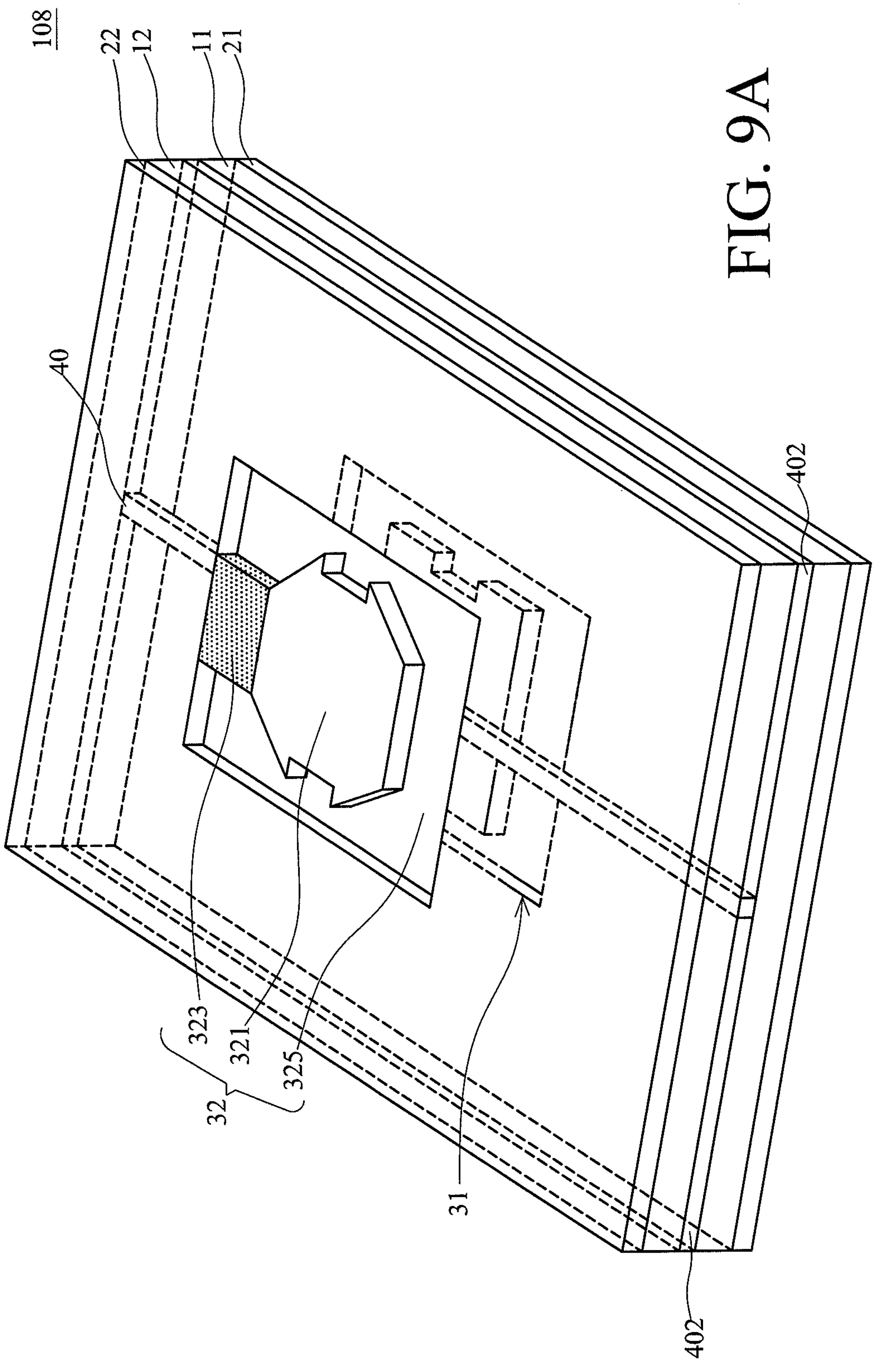
FIG. 9A and FIG. 9B depict respectively a stereogram diagram and a cross-sectional diagram of an electromagnetic noise suppression circuit according to another embodiment of the present invention.
Figure 9B:
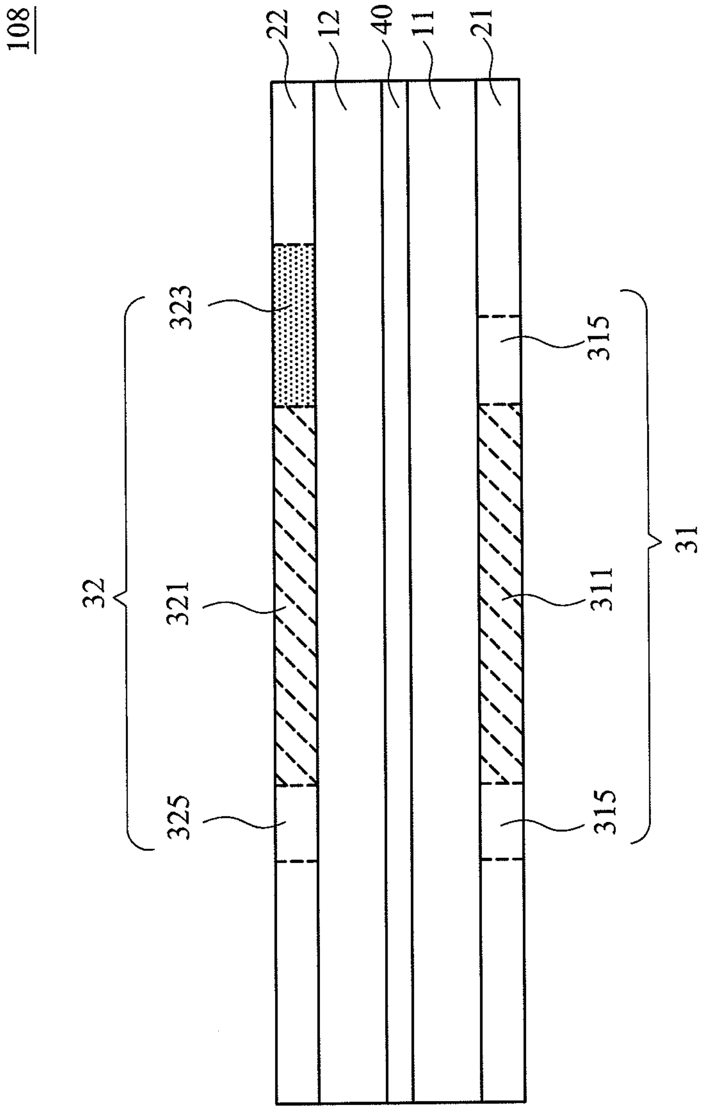

Please refer to FIG. 9A and FIG. 9B, which depict respectively a stereogram diagram and a cross-sectional diagram of an electromagnetic noise suppression circuit according to another embodiment of the present invention. Compared to the embodiment of FIGS. 8A and 8B, the second distributed coupling structure 32 of the electromagnetic noise suppression circuit 108 of the present embodiment further comprises at least one second connecting portion 323.

The second grounding plane 22 is etched to form the second defected portion 325 of the second distributed coupling structure 32 according to at least one of the shape of the second metal pad 321 and the length of the second connecting portion 323. The second defected portion 325 surrounds at least one of the second metal pad 321 and the second connecting portion 323. The second connecting portion 323 and the second metal pad 321 are coplanarly configured, and the second metal pad 321 is connected to the second grounding plane 22 through the second connecting portion 323. Hereby, the second connecting portion 323 is regarded as a grounding inductor.

Figure 9C:
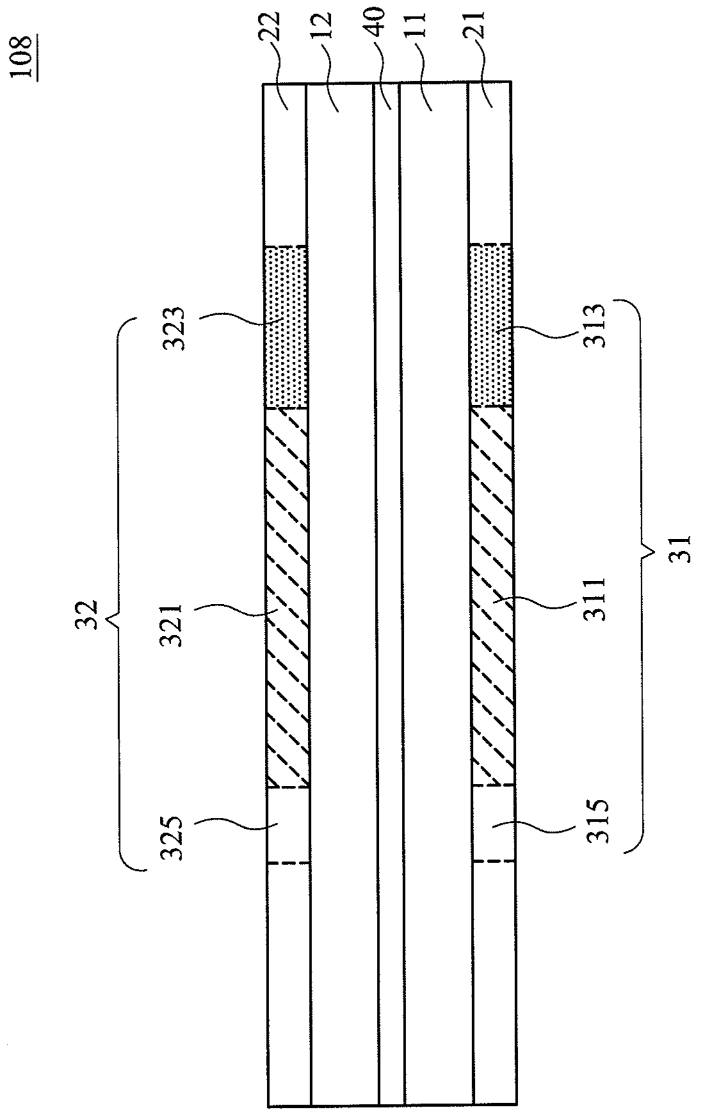
FIG. 9C depicts a cross-sectional diagram of an electromagnetic noise suppression circuit according to another embodiment of the present invention.

Certainly, as shown in FIG. 9C, the first distributed coupling structure 31 may further comprise at least one first connecting portion 313. The first grounding plane 21 is etched to form the first defected portion 315 of the first distributed coupling structure 31 according to at least one of the shape of the first metal pad 311 and the length of the first connecting portion 313. The first defected portion 315 surrounds at least one of the first metal pad 311 and the first connecting portion 313. Similarly, the first connecting portion 313 and the first metal pad 311 are coplanarly configured. The first metal pad 311 is connected to the first grounding plane 21 through the first connecting portion 313. Hereby, the first connecting portion 313 is regarded another grounding inductor.

Figure 10:
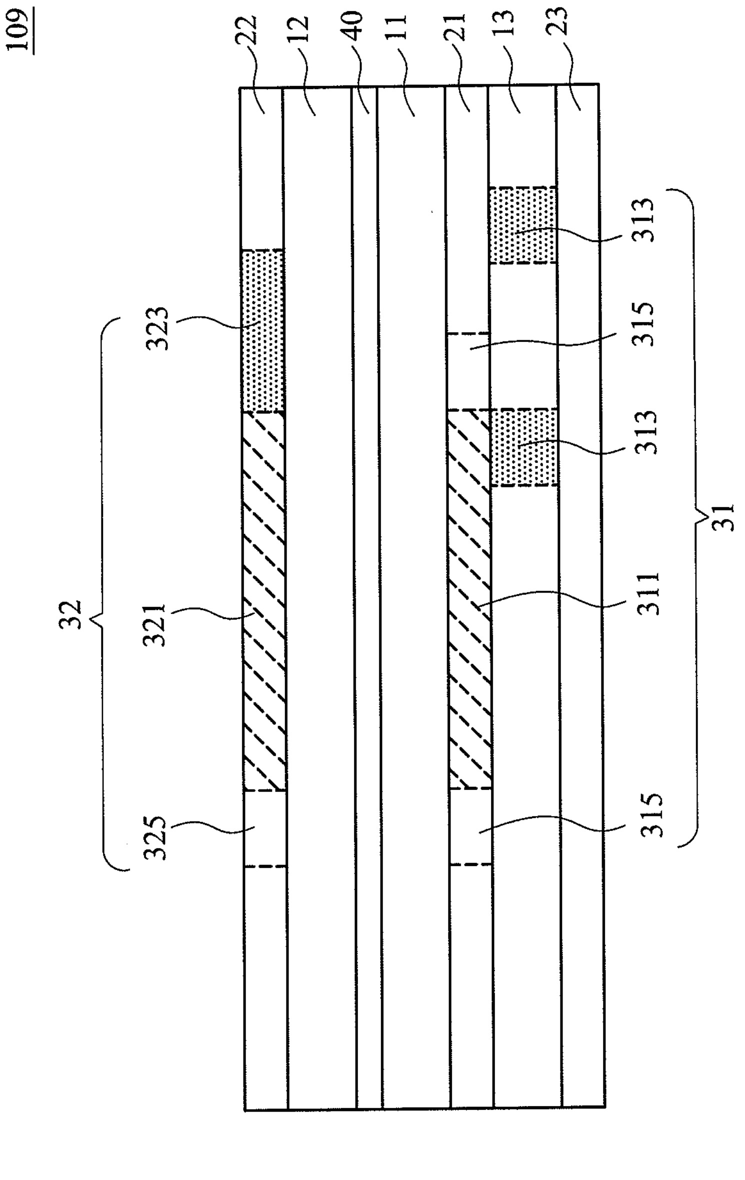
FIG. 10 depicts a cross-sectional diagram of an electromagnetic noise suppression circuit according to another embodiment of the present invention.

Please refer to FIG. 10, which depicts a cross-sectional diagram of an electromagnetic noise suppression circuit according to another embodiment of the present invention. Compared to the embodiment of FIG. 9A to FIG. 9C, the electromagnetic noise suppression circuit 109 of the present embodiment further comprises a third substrate 13 and a third grounding plane 23. The third substrate 13 and the third grounding plane 23 are configured on the bottom surface of the first grounding plane 21 in order.

The first metal pad 311 of the first distributed coupling structure 31 is connected to the third grounding plane 23 through one of the first connecting portions 313 among the third substrate 13, and the third grounding plane 23 is connected to the first grounding plane 21 through another first connecting portion 313. The first metal pad 311 and the grounding plane electrically connected thereto (for example, the third grounding plane 23) may be non-coplanarly configured. The second metal pad 321 and the grounding plane electrically connected thereto (for example, the second grounding plane 22) may be coplanarly configured.

Figure 11:
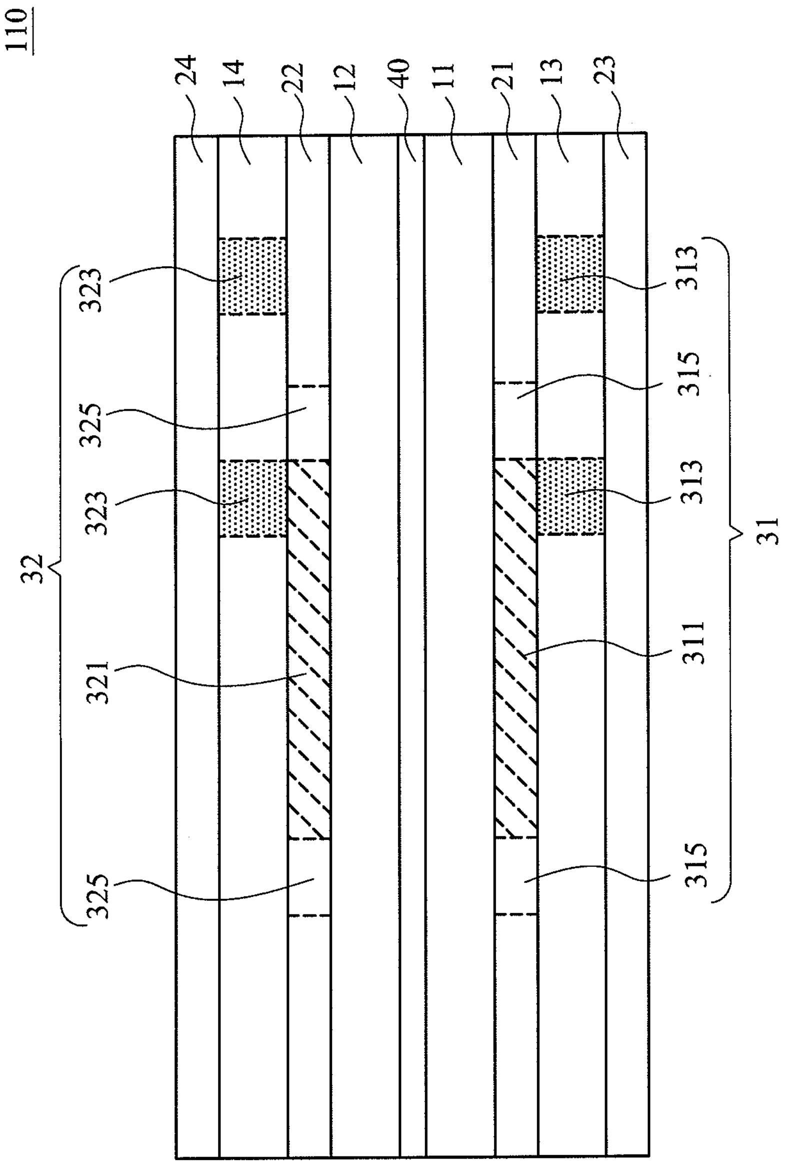
FIG. 11 depicts a cross-sectional diagram of an electromagnetic noise suppression circuit according to another embodiment of the present invention.

Please refer to FIG. 11, which depicts a cross-sectional diagram of an electromagnetic noise suppression circuit according to another embodiment of the present invention. Compared to the embodiment of FIG. 10, the electromagnetic noise suppression circuit 110 of the present embodiment further comprises a fourth substrate 14 and a fourth grounding plane 24. The fourth substrate 14 and the fourth grounding plane 24 are configured on the top surface of the second grounding plane 22 in order.

The second metal pad 321 of the second distributed coupling structure 32 is connected to the fourth grounding plane 24 through one of the second connecting portions 323 among the fourth substrate 14, and the fourth grounding plane 24 is connected to the second grounding plane 22 through another second connecting portion 323. The first metal pad 311 and the grounding plane electrically connected thereto (for example, the third grounding plane 23) may be non-coplanarly configured, and the second metal pad 321 and the grounding plane electrically connected thereto (for example, the fourth grounding plane 24) may also be non-coplanarly configured.

Moreover, in FIG. 8A-8B, FIG. 9A-9C, FIG. 10 and FIG. 11, the first connecting portion 313 and the second connecting portion 323 may also be designed to be a coplanar straight structure, a three-dimensional straight structure, a coplanar zigzag structure or a three-dimensional zigzag structure according to practical demand.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. An electromagnetic noise suppression circuit, comprising:

a first substrate;

a first grounding plane configured on the bottom surface of said first substrate and comprising a first distributed coupling structure therein, said first distributed coupling structure comprising:

a first defected portion; and at least one first metal pad connected to said first grounding plane through at least one first connecting portion, wherein said first defected portion surrounds at least one of said first metal pad and said first connecting portion; and at least one transmission line configured on the top surface of said first substrate and with respect to said first metal pad so that at least one coupling capacitor is formed between said transmission line and said first metal pad.

2. The electromagnetic noise suppression circuit as recited in claim 1, wherein said first connecting portion is a coplanar straight structure, a three-dimensional straight structure, a coplanar zigzag structure or a three-dimensional zigzag structure.

3. The electromagnetic noise suppression circuit as recited in claim 1, wherein a pair of coupled transmission wires are consisted of two transmission lines so that said coupled transmission wires and said first distributed coupling structure are configured to be equivalent to an inductor-capacitor resonant circuit for suppressing common-mode electromagnetic noise within a designated frequency band.

4. The electromagnetic noise suppression circuit as recited in claim 1, wherein said first grounding plane is etched to form said first defected portion of said first distributed coupling structure according to at least one of the shape of said first metal pad and the length of said first connecting portion.

5. The electromagnetic noise suppression circuit as recited in claim 1, wherein said transmission line comprises a bended portion, said bended portion is configured on the top surface of said first substrate and with respect to said first metal pad.

6. The electromagnetic noise suppression circuit as recited in claim 1, further comprising a dielectric layer configured on said transmission line, said transmission line comprising a bended portion that comprises a plurality of bended segments being configured among said dielectric layer and with respect to said first metal pad.

7. The electromagnetic noise suppression circuit as recited in claim 1, wherein said first distributed coupling structure comprises a second metal pad, and said first defected portion surrounds at least one of said first metal pad, said second metal pad and said first connecting portion.

8. The electromagnetic noise suppression circuit as recited in claim 7, wherein said first grounding plane is etched to form said first defected portion of said first distributed coupling structure according to at least one of the shape of said first metal pad, the shape of said second metal pad and the length of said first connecting portion.

9. The electromagnetic noise suppression circuit as recited in claim 7, wherein said first connecting portion, said first metal pad, said second metal pad and said first grounding plane are coplanar or non-coplanar.

10. An electromagnetic noise suppression circuit, comprising:

a first substrate;

a second substrate;

a first grounding plane configured on the bottom surface of said first substrate and comprising a first distributed coupling structure therein, said first distributed coupling structure comprising:

a first defected portion;

a plurality of first connecting portion configured among said second substrate; and a first metal pad surrounded by said first defected portion;

a second grounding plane configured on the bottom surface of said second substrate, wherein said first metal pad is connected to said second grounding plane through one of said first connecting portions and said second grounding plane is connected to said first grounding plane through another one of said first connecting portions; and at least one transmission line configured on the top surface of said first substrate and with respect to said first metal pad so that at least one coupling capacitor is formed between said transmission line and said first metal pad.

11. The electromagnetic noise suppression circuit as recited in claim 10, wherein said first metal pad and said first grounding plane are non-coplanar, and said first connecting portions are a three-dimensional straight structure or a three-dimensional zigzag structure.

12. The electromagnetic noise suppression circuit as recited in claim 10, wherein a pair of coupled transmission wires are consisted of two transmission lines so that said coupled transmission wires and said first distributed coupling structure are configured to be equivalent to an inductor-capacitor resonant circuit for suppressing common-mode electromagnetic noise within a plurality of designated frequency bands.

13. The electromagnetic noise suppression circuit as recited in claim 10, wherein said first grounding plane is etched to form said first defected portion of said first distributed coupling structure according to the shape of said first metal pad.

14. The electromagnetic noise suppression circuit as recited in claim 10, wherein said transmission line comprises a bended portion, said bended portion is configured on the top surface of said first substrate and with respect to said first metal pad.

15. The electromagnetic noise suppression circuit as recited in claim 10, further comprising a dielectric layer configured on said transmission line, said transmission line comprising a bended portion that comprises a plurality of bended segments being configured among said dielectric layer and with respect to said first metal pad.

16. The electromagnetic noise suppression circuit as recited in claim 10, wherein said first distributed coupling structure comprises a second metal pad, and said first defected portion surrounds at least one of said first metal pad and said second metal pad.

17. The electromagnetic noise suppression circuit as recited in claim 16, wherein said first grounding plane is etched to form said first defected portion of said first distributed coupling structure according to at least one of the shape of said first metal pad and said second metal pad.

18. An electromagnetic noise suppression circuit, comprising:

a first substrate;

a second substrate;

a first grounding plane configured on the bottom surface of said first substrate and comprising a first distributed coupling structure therein, said first distributed coupling structure comprising:

a first defected portion; and a first metal pad surrounded by said first defected portion;

a second grounding plane configured on the top surface of said second substrate and comprising a second distributed coupling structure therein, said second distributed coupling structure comprising:

a second defected portion; and a second metal pad surrounded by said second defected portion; and at least one transmission line configured between said first substrate and said second substrate and with respect to said first metal pad and said second metal pad so that at least one coupling capacitor is formed between said transmission line and said first metal pad and between said transmission line and said second metal pad, respectively.

19. The electromagnetic noise suppression circuit as recited in claim 18, wherein said first distributed coupling structure comprises at least one first connecting portion, wherein said first connecting portion, said first metal pad and said first grounding plane are coplanar or non-coplanar, said first metal pad is connected to said first grounding plane through said first connecting portion, and said first connecting portion is a coplanar straight structure, a three-dimensional straight structure, a coplanar zigzag structure or a three-dimensional zigzag structure.

20. The electromagnetic noise suppression circuit as recited in claim 18, wherein said second distributed coupling structure comprises at least one second connecting portion, wherein said second connecting portion, said second metal pad and said second grounding plane are coplanar or non-coplanar, said second metal pad is connected to said second grounding plane through said second connecting portion, and said second connecting portion is a coplanar straight structure, a three-dimensional straight structure, a coplanar zigzag structure or a three-dimensional zigzag structure.

21. The electromagnetic noise suppression circuit as recited in claim 18, further comprising a third substrate and a third grounding plane, wherein said third substrate and said third grounding plane are configured on the bottom surface of said first grounding plane in order, said first distributed coupling structure further comprises a plurality of first connecting portions that are configured among said third substrate, and said first metal pad is connected to said third grounding plane through one of said first connecting portions and said third grounding plane is connected to said first grounding plane through another one of said first connecting portions.

22. The electromagnetic noise suppression circuit as recited in claim 18, further comprising a fourth substrate and a fourth grounding plane, wherein said fourth substrate and said fourth grounding plane are configured on the top surface of said second grounding plane in order, said second distributed coupling structure further comprises a plurality of second connecting portions that are configured among said fourth substrate, and said second metal pad is connected to said fourth grounding plane through one of said second connecting portions and said fourth grounding plane is connected to said second grounding plane through another one of said second connecting portions.

23. The electromagnetic noise suppression circuit as recited in claim 18, wherein said transmission line, said first distributed coupling structure and said second distributed coupling structure are configured to be equivalent to an inductor-capacitor resonant circuit for suppressing electromagnetic noise within a plurality of designated frequency bands.

24. The electromagnetic noise suppression circuit as recited in claim 18, wherein a pair of coupled transmission wires are consisted of two transmission lines so that said coupled transmission wires, said first distributed coupling structure and said second distributed coupling structure are configured to be equivalent to an inductor-capacitor resonant circuit for suppressing common-mode electromagnetic noise within a plurality of designated frequency bands.

25. The electromagnetic noise suppression circuit as recited in claim 19, wherein said first grounding plane is etched to form said first defected portion of said first distributed coupling structure according to at least one of the shape of said first metal pad and the length of said first connecting portion.

26. The electromagnetic noise suppression circuit as recited in claim 20, wherein said second grounding plane is etched to form said second defected portion of said second distributed coupling structure according to at least one of the shape of said second metal pad and the length of said second connecting portion.

27. The electromagnetic noise suppression circuit as recited in claim 18, wherein said transmission line comprises a bended portion, said bended portion is configured on the top surface of said first substrate and with respect to said first metal pad and said second metal pad.

* * * * *